United States Patent
Tomoe et al.

(10) Patent No.: US 9,467,905 B2
(45) Date of Patent: *Oct. 11, 2016

(54) BASE TRANSCEIVER STATION APPARATUS AND MOBILE COMMUNICATIONS SYSTEM

(71) Applicant: MITSUBISHI DENKI KABUSHIKI KAISHA, Chiyoda-ku (JP)

(72) Inventors: Naohito Tomoe, Tokyo (JP); Syouhei Suyama, Tokyo (JP)

(73) Assignee: MITSUBISHI DENKI KABUSHIKI KAISHA, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,532

(22) Filed: Jan. 7, 2014

(65) Prior Publication Data

US 2014/0119342 A1  May 1, 2014

Related U.S. Application Data

(60) Continuation of application No. 12/169,172, filed on Jul. 8, 2008, now Pat. No. 8,706,116, which is a division of application No. 10/558,196, filed as application No. PCT/JP03/07820 on Jun. 19, 2003, now Pat. No. 7,418,273.

(51) Int. Cl.
*H04W 36/00* (2009.01)
*H04L 12/701* (2013.01)
(Continued)

(52) U.S. Cl.
CPC .......... *H04W 36/0016* (2013.01); *H04L 45/00* (2013.01); *H04L 69/22* (2013.01);
(Continued)

(58) Field of Classification Search
USPC ............................................. 455/432.1–448
See application file for complete search history.

(56) References Cited

U.S. PATENT DOCUMENTS 5,487,065 A   1/1996  Acampora et al.
5,844,899 A   12/1998  Daley et al.
(Continued)

FOREIGN PATENT DOCUMENTS

CN   1301474 A   6/2001
CN   1395767 A   2/2003
(Continued)

OTHER PUBLICATIONS

Teraoka, Fumio, "Trends in Standardization of Mobile Communications Protocols for the Internet", Institute of Electronics, Information and Communication Engineers paper magazine, Bol. J84-B, No. 10, pp. 1746-1754, 2001. (with partial English translation).

(Continued)

*Primary Examiner* — Joel Ajayi
(74) *Attorney, Agent, or Firm* — Oblon, McClelland, Maier & Neustadt, L.L.P.

(57) ABSTRACT

When carrying out a downlink handover, a source base transceiver station from which a mobile node is moving receives packets to be transmitted, via a wireless section, to the mobile node from an IP network, and copies and transfers them to a destination base transceiver station to which the mobile node is moving. On the other hand, when carrying out an uplink handover, the source base transceiver station compares the reliability of transport blocks which are received via a wireless section, from the mobile node and which are demodulated and decoded by the local station with that of transport blocks which are received via an IP network, from another base transceiver station and which are demodulated and decoded thereby, packetizes selected transport blocks with a better quality, and transmits them to a communications-partner node according to a route table, thereby implementing distribution of traffic via the IP network.

8 Claims, 11 Drawing Sheets

(51) Int. Cl.
*H04W 36/02* (2009.01)
*H04L 29/06* (2006.01)
*H04W 36/18* (2009.01)
*H04W 40/24* (2009.01)
*H04W 40/36* (2009.01)
*H04W 80/04* (2009.01)

(52) U.S. Cl.
CPC ............ *H04W 36/02* (2013.01); *H04W 36/18* (2013.01); *H04W 40/248* (2013.01); *H04W 40/36* (2013.01); *H04W 80/04* (2013.01)

(56) References Cited

U.S. PATENT DOCUMENTS

| | | | |
|---|---|---|---|
| 6,119,018 | A | 9/2000 | Kondo |
| 6,246,878 | B1* | 6/2001 | Wallentin ...................... 455/442 |
| 6,396,820 | B1 | 5/2002 | Dolan et al. |
| 6,904,028 | B1* | 6/2005 | Semper .......................... 370/331 |
| 2001/0014092 | A1 | 8/2001 | Suzuki et al. |
| 2002/0141360 | A1 | 10/2002 | Baba et al. |
| 2002/0187809 | A1 | 12/2002 | Mani et al. |
| 2003/0043764 | A1 | 3/2003 | Kim et al. |
| 2003/0072395 | A1 | 4/2003 | Jia et al. |
| 2003/0081692 | A1 | 5/2003 | Kwan et al. |
| 2003/0083069 | A1 | 5/2003 | Vadgama |
| 2004/0106425 | A1 | 6/2004 | Koo et al. |

FOREIGN PATENT DOCUMENTS

| | | |
|---|---|---|
| JP | 2002-064544 | 2/2002 |
| JP | 2003-060683 | 2/2003 |
| JP | 2003-069617 | 3/2003 |

OTHER PUBLICATIONS

Office Action mailed Mar. 23, 2015, in Chinese Patent Application No. 20091013785.X.

Cohen et al., "Handover in a micro-cell packet switched mobile network," Wireless Networks, vol. 2, Issue 1, 1996, pp. 13-25.

Chinese Office Action issued Dec. 16, 2015 in Patent Application No. 200910137185.X (with partial English language translation).

* cited by examiner

BASE TRANSCEIVER STATION APPARATUS AND MOBILE COMMUNICATIONS SYSTEM

CROSS REFERENCE TO RELATED APPLICATIONS

This application is a continuation of and is based upon and claims the benefit of priority under 35 U.S.C. §120 for U.S. Ser. No. 12/169,172, filed Jul. 8, 2008, which claims the benefit of priority under 35 U.S.C. §120 for U.S. Ser. No. 10/558,196, filed Nov. 25, 2005, (now U.S. Pat. No. 7,418,273 issued Aug. 28, 2008), which is a National Stage of PCT/JP03/07820, filed Jun. 19, 2003, the entire contents of each which are incorporated herein by reference.

FIELD OF THE INVENTION

The present invention relates to an improvement in the efficiency of handoff processing and MIMO transmission by a base transceiver station for use in a mobile communications system which handles IP packets.

BACKGROUND OF THE INVENTION

A related art mobile communications system which handles IP packets is disclosed by, for example, "Trends in standardization of mobile communications protocols for the Internet" (Institute of Electronics, Information and Communication Engineers paper magazine 2001/10).

According to Mobile IPv6, every time a mobile node moves, a binding response for updating of binding is exchanged between the mobile node and a home agent. Therefore, when the mobile node moves frequently, such control traffic causes congestions of the network.

Furthermore, when it takes much time for the mobile communications system to carry out binding with a home agent or a communications-partner node, packets are relayed to a location where the mobile node stayed previously and this causes a loss of some of them.

In order to solve such a problem, hierarchical mobile IPv6 and cellular IPv6 are proposed, for example.

In related art mobile communications systems which handle IP packets, even in a case of hierarchical mobile IPv6 or cellular IPv6, an SPF (single point of failure) problem arises in a local home agent and a boundary router which serves as a cellular IP gateway. A problem with related art mobile communications systems is therefore that it is difficult to thoroughly eliminate the possibility that there causes congestions of the network due to increases in the amount of control traffic when a mobile node move frequently, or there causes a loss of packets because the packets are relayed to a location where the mobile node stayed previously when it takes much time to carry out updating of binding and route changing due to the movement of the mobile node.

Another problem with mobile communications systems which assign high-speed downlink packets, such as HSDPA (High-Speed Downlink Packet Access), to two or more communications nodes at a high speed is that when a mobile node moves from a cell under control of an arbitrary base transceiver station to a cell under control of another arbitrary base transceiver station and performs a handover using, for example, SSDT (Site Selection Diversity Transmit Power Control) which minimizes downlink interference power at this time, a control delay occurs due to control of transmission via radio downlinks extending from an RNC to both the source base transceiver station from which the mobile node is moving and the destination base transceiver station to which the mobile node is moving, or when both the source base transceiver station and the destination base transceiver station receive primary cell/non-primary cell control data from the mobile node via radio uplinks, as in the case of using SSDT, there causes congestions in the network since the RNC transmits downlink data packets, via the network, to both the source base transceiver station and the destination base transceiver station.

A further problem with mobile communications systems which assign high-speed downlink packets, such as HSDPA, to two or more communications nodes at a high speed is that when base transceiver stations are so constructed as to carry out ARQ (Auto Repeat reQuest), all base transceiver stations which are carrying out communications with the mobile node need a memory space for temporary buffering of packets to be resent.

A still further problem is that even in a case of providing multiple values of transmission symbol in space by simultaneously transmitting plural different transmission symbols from a plurality of transmit antennas using an MIMO (Multi-Input Multi-Output) transmission method, so as to implement further high-speed packet communications, the implementation of this technique in each base transceiver station causes an increase in the cost of each base transceiver station because of increases in the number of transmitters and the number of antennas included in each base transceiver station, while the system cannot obtain optimal cost performance since mobile nodes can require different data speeds.

The present invention is made in order to solve the above-mentioned problems, and it is therefore an object of the present invention to provide a radio communications system which, when a routing function is provided to each base transceiver station and a mobile node is moving from a cell under control of an arbitrary base transceiver station having the routing function to another cell under control of another arbitrary base transceiver station having the routing function, can reduce the frequency of generation of control packets for updating of binding and route changing, which are to be transmitted to a boundary router, and can improve network congestions and losses of packets since the radio communications system can localize congestions of packets on the network due to the movement of the mobile node only between the source base transceiver station from which the mobile node is moving and the destination base transceiver station to which the mobile node is moving by controlling the destination base transceiver station or the mobile node to transfer packets from a communications-partner node to the destination base transceiver station.

It is another object of the present invention to provide a mobile communications system which assigns high-speed downlink packets, such as HSDPA, to two or more communication nodes at a high speed, and in which, when a mobile node is moving from a cell under control of an arbitrary base transceiver station to another cell under control of another arbitrary base transceiver station and performs a handover using SSDT which minimizes downlink interference power at this time, the source base transceiver station transfers downlink packets to the destination base transceiver station using a routing function thereof, each of the source base transceiver station and destination base transceiver station has a function of detecting information transmitted from the mobile node and indicating whether or not the local station is a base transceiver station for downlink radiocommunications, and the source base transceiver station has a function of determining and selecting whether or not to transmit the downlink packets, via a network, to the destination base transceiver station based on the detection result, so that the source base transceiver station and destination base transceiver station can implement a handover function, which is conventionally performed by an RNC, thereby preventing the occurrence of network congestions which conventionally occur due to transmission of packets to both the source base transceiver station and the destination base transceiver station at the time of a soft handover, reducing a control delay, implementing a handover which is suitable for the conditions of a radio link with the mobile node, which vary with time, and which enables a quick cell selection, and hence improving a maximum throughput via the radio downlink.

It is a further object of the present invention to reduce the cost of each base transceiver station in the mobile communications system which assigns high-speed downlink packets, such as HSDPA, to two or more communication nodes at a high speed, by making it possible for only a base transceiver station with which the mobile node has established a radio link connection for the first time to perform a function of temporarily buffering packets to be resent to the mobile node, which causes a problem when each base transceiver station can perform ARQ, by performing a function of transferring packets between base transceiver stations using the routing function.

It is a still further object of the present invention to implement MIMO transmission with good cost performance, by, when simultaneously transmitting a plurality of different transmission symbols from a plurality of transmission antennas to provide multiple values of transmission symbol in space according to an MIMO transmission method, thereby implementing higher-speed packet communications, selecting a number of base transceiver stations according to data speed requested by the mobile node from two or more base transceiver stations providing cells adjacent to the cell in which the mobile node is staying, dividing each downlink packet into plural parts for the selected base transceiver stations, and transferring the plural parts to the selected base transceiver stations, respectively, using the routing function.

DISCLOSURE OF THE INVENTION

A base transceiver station apparatus in accordance with the present invention includes: an analyzing means for analyzing a header of an IP packet received by the base transceiver station apparatus; a routing means for transferring the IP packet to another base transceiver station based on a route table when a result of analyzing the header by the analyzing means indicates that the IP packet is not destined for the local base transceiver station, and for transferring the IP packet to a transmitting unit of the local base transceiver station when the result of analyzing the header by the analyzing means indicates that the IP packet is destined for the local base transceiver station; a means for, when transmitting a packet to a mobile node which is communicating with the local base transceiver station, acquiring a base station control packet sent from an RNC via the routing means, and dividing and converting transmission processing information on the mobile node into plural pieces of information in units of TTI in which information is transferred between L1 and MAC based on the base station control packet, the TTI being equal to a time interval during which information is transmitted between layers of transport block set; an error correction coding means for inputting the transport blocks into which the transmission processing information is divided and converted, and for error correction coding the transport blocks; a modulating means for inputting the coded data output from the error correction coding means, and for modulating the coded data; and a transmitting means for converting digital baseband data which is the modulated, coded data output by the modulation means into an analog baseband signal, for converting a frequency of the analog baseband signal to a transmission carrier frequency, for performing a band limit on the analog baseband signal on the transmission carrier frequency and for amplifying it so that it has desired transmission power, and for separating signals lying within a transmission frequency band and signals lying within a reception frequency band from each other using a duplexer so as to transmit the analog baseband signal on the transmission carrier frequency having the desired transmission power, as a radio signal, to the mobile node via a transmit/receive antenna.

Therefore, the present invention offers an advantage of being able to prevent congestions of the IP network and any loss of packets from occurring due to a movement of the mobile node without degradation in the radio line quality, thereby implementing distribution of traffic via the IP network.

The base transceiver station apparatus in accordance with the present invention includes: a demodulating/calculating means for receiving a radio signal transmitted by the mobile node via the transmit/receive antenna, for separating signals lying within a transmission frequency band and signals lying within a reception frequency band from each other using a duplexer so as to amplify the received radio signal and perform a band limit on the received radio signal, for carrying out frequency conversion of the radio signal having a carrier frequency to generate an analog baseband signal, for converting the analog baseband signal into a digital baseband signal, for demodulating the digital baseband signal, and for calculating an SIR; an error correction decoding means for performing error correction decoding on the demodulated data output from the demodulating/calculating means, and for calculating a CRC; a packet generating/converting means for packetizing transport blocks which are the decoded data for each TTI which are output by the error correction decoding means, the CRC indicating the decoded result, and an average SIR calculation result which is an average of calculation results of the SIR in units of the TTI into packets; a packet sending means for, when the mobile node is carrying out a handover to move from the local station which is a source base transceiver station to a destination base transceiver station, sending the generated packets, into which the transport blocks and so on have been converted, from the destination base transceiver station to the source base transceiver station; an output means for, in the source base transceiver station, acquiring the packets sent to the source base transceiver station, via the routing means and the means for dividing/converting each of the sent packets into transport blocks, for comparing reliability of a transport block contained in a payload of each of packets received by the source base transceiver station with that of a transport block contained in a payload of each of the packets sent from the destination base transceiver station by comparing the calculated CRC and average SIR of each of the received packets with those of each of the packets sent from the destination base transceiver station, and for outputting selected transport blocks; and an RNC transmitting means for packetizing only the transport blocks outputted by the output means into packets, and for transmitting the packets to the RNC via an IP network.

Therefore, the present invention offers an advantage of being able to prevent congestions of the IP network and any loss of packets from occurring due to a movement of the mobile node without degradation in the radio line quality, thereby implementing distribution of traffic via the IP network.

In the base transceiver station apparatus in accordance with the present invention, the mobile node includes a means for, when a difference between the reception power of a cell search signal outputted by a source base transceiver station with which the mobile node is currently communicating and from which the mobile node is moving, and the reception power of a cell search signal outputted by another base transceiver station which provides a cell adjacent to that of the source base transceiver station falls within a threshold which is predetermined in a system, transmitting a connection request including an identifier of the source base transceiver station to the other base transceiver station which provides the adjacent cell and which is determined by the mobile node that the reception power of the cell search signal differs from that of the cell search signal outputted from the source base transceiver station by the threshold or less. Furthermore, the other base transceiver station, which provides the adjacent cell and which is determined by the mobile node that the reception power of the cell search signal differs from that of the cell search signal output from the source base transceiver station by the threshold or less, includes a means for packetizing a base-station-to-base-station message to carry out communications between the other base transceiver station and the source base transceiver station, in order to make a request of the source base transceiver station to transfer a packet destined for the mobile node thereto, and the source base transceiver station includes a means for transferring the packet destined for the mobile node to the other base transceiver station in response to the packet transfer request from the other base transceiver station using the routing means, and for outputting the same packet to the local station's transmitting unit also using the routing means so as to transmit a radio signal associated with the packet from the source base transceiver station to the mobile node.

Therefore, the present invention offers an advantage of being able to prevent congestions of the IP network and any loss of packets from occurring due to a movement of the mobile node without degradation in the radio line quality, thereby implementing distribution of traffic via the IP network.

In the base transceiver station apparatus in accordance with the present invention, when the analyzing means determines that the received IP packet is a packet which requests real time processing based on priority information and a flow label as a result of the analysis of the header of the received IP packet, the routing means gives a higher priority to the packet than to other packets to output the packet to either a means, which is the transmitting means, for dividing and converting a packet into transport blocks, or a means for comparing generated transport blocks into which a packet is converted by the local station which is the source base transceiver station, with transport blocks which are obtained from the received IP packet through the routing means and the means for dividing and converting the IP packet into the transport blocks, and which are generated and converted by the destination base transceiver station to select either the former transport blocks or the latter transport blocks, and for outputting the selected transport blocks.

Therefore, the present invention offers an advantage of being able to prevent congestions of the IP network and any loss of packets from occurring due to a movement of the mobile node without degradation in the radio line quality, thereby implementing distribution of traffic via the IP network.

A mobile communications system in accordance with the present invention includes: two base transceiver station apparatus according to any one of claims 1 to 4; an IP network disposed between the two base transceiver station apparatus, for connecting between the two base transceiver station apparatus; an IP backbone network which connects the IP network disposed between the two base transceiver station apparatus with another IP network; and a boundary router which connects the two base transceiver station apparatus to the IP backbone network.

Therefore, the present invention offers an advantage of being able to provide a mobile communications system which can prevent congestions of the network from occurring and can prevent any loss of packets.

A base transceiver station apparatus in accordance with the present invention includes: an analyzing means for analyzing a header of an IP packet received by the base transceiver station apparatus; a routing means for transferring the IP packet to another base transceiver station based on a route table when a result of analyzing the header by the analyzing means indicates that the IP packet is not destined for the local base transceiver station, and for transferring the IP packet to a transmitting unit of the local base transceiver station when the result of analyzing the header by the analyzing means indicates that the IP packet is destined for the local base transceiver station; a means for, when transmitting a packet to a mobile node which is communicating with the local base transceiver station, acquiring a base station control packet sent from an RNC via the routing means, and dividing and converting transmission processing information on the mobile node into plural pieces of information in units of TTI in which information is transferred between L1 and MAC based on the base station control packet, the TTI being equal to a time interval during which information is transmitted between layers of transport block set; an error correction coding means for inputting the transport blocks into which the transmission processing information is divided and converted, and for error correction coding the transport blocks; a modulating means for inputting the coded data output from the error correction coding means, and for modulating the coded data; and a transmitting means for converting digital baseband data which is the modulated, coded data output by the modulation means into an analog baseband signal, for converting a frequency of the analog baseband signal to a carrier frequency, for performing a band limit on the analog baseband signal and for amplifying it so that it has desired transmission power, and for separating signals lying within a transmission frequency band and signals lying within a reception frequency band from each other using a duplexer so as to transmit the analog baseband signal having the desired transmission power, as a radio signal, to the mobile node via a transmit/receive antenna. Furthermore, the means for dividing and converting a packet into transport blocks includes: a storing means for outputting the divided and converted transport blocks to the error correction coding means at a next stage, and for storing the transport blocks in a temporary memory; another storing means for outputting the transport blocks stored in the temporary memory to the error correction coding means in response to a resending request (NACK) from the mobile node, and for storing the transport blocks in the temporary memory again; an erasing means for erasing the transport blocks which the mobile node has finished receiving from the temporary memory in response to an acknowledgment signal (ACK) indicating the reception of the packet from the mobile node; and a means for transferring the packet from a source base transceiver station from which the mobile node is moving to a destination base transceiver station to which the mobile node is moving while the mobile node is carrying out a handover, and each of the source and destination base transceiver stations includes: a handover means for performing a handover using SSDT so as to output the packet to the local station's error correction coding means when determining that the local station is a primary cell, and so as not to output the packet to the local station's error correction coding means when determining that the location is a non-primary cell; and a means for transferring the packet to either the local station's internal circuit block or the destination base transceiver station regardless of whether a base transceiver station which has transmitted a packet to the mobile node last time is the source base transceiver station or the destination base transceiver station so that the base transceiver station which is a primary cell now resends the packet in response to the resending request.

Therefore, the present invention offers an advantage of being able to prevent congestions of the IP network and any loss of packets from occurring due to updating of binding and route changing, which are caused by a movement of the mobile node, without degradation in the radio line quality, thereby implementing distribution of traffic via the IP network.

The base transceiver station apparatus in accordance with the present invention includes: a demodulating/calculating means for receiving a radio signal transmitted by the mobile node via the transmit/receive antenna, for separating signals lying within a transmission frequency band and signals lying within a reception frequency band from each other using a duplexer so as to amplify the received radio signal and perform a band limit on the received radio signal, for carrying out frequency conversion of the radio signal having a carrier frequency to generate an analog baseband signal, for converting the analog baseband signal into a digital baseband signal, for demodulating the digital baseband signal, and for calculating an SIR; an error correction decoding means for performing error correction decoding on the demodulated data output from the demodulating/calculating means, and for calculating a CRC; a packet generating/converting means for packetizing transport blocks which are the decoded data in units of TTI which are output by the error correction decoding means, the CRC indicating the decoded result, and an average SIR calculation result which is an average of calculation results of the SIR in units of the TTI into packets; a packet sending means for, when the mobile node is carrying out a handover to move from the local station which is a source base transceiver station to a destination base transceiver station, sending the generated packets, into which the transport blocks and so on have been converted, from the destination base transceiver station to the source base transceiver station; an output means for, in the source base transceiver station, acquiring the packets sent to the source base transceiver station, via the routing means and the means for dividing/converting each of the sent packets into transport blocks, for comparing reliability of a transport block contained in a payload of each of packets received by the source base transceiver station with that of a transport block contained in a payload of each of the packets sent from the destination base transceiver station by comparing the calculated CRC and average SIR of each of the received packets with those of each of the packets sent from the destination base transceiver station, and for outputting selected transport blocks; an RNC transmitting means for packetizing only the transport blocks outputted by the output means, and for transmitting them to the RNC via an IP network; a detecting means for detecting a primary cell/non-primary cell specification bit contained in the data which is received from the mobile node and which is demodulated; another output means for dividing and converting a packet including the primary cell/non-primary cell specification bit into transport blocks, for storing the converted transport blocks in a temporary memory, and for outputting the converted transport blocks to an ARQ control means and a scheduling means which determine whether to resend a requested packet from the local station to the mobile node, or to transfer the requested packet to be resent to the destination base transceiver station; and an updating means for updating the route table based on the primary cell/non-primary cell specification bit for transfer of the requested packet to be resent to the mobile node to the destination base transceiver station.

Therefore, the present invention offers an advantage of being able to prevent congestions of the IP network and any loss of packets from occurring due to updating of binding and route changing, which are caused by a movement of the mobile node, without degradation in the radio line quality, thereby implementing distribution of traffic via the IP network.

In the base transceiver station apparatus, the mobile node includes a means for, when a difference between the reception power of a cell search signal outputted by a source base transceiver station with which the mobile node is currently communicating and from the mobile node is moving, and the reception power of a cell search signal output by another base transceiver station which provides a cell adjacent to that of the source base transceiver station falls within a threshold which is predetermined in a system, transmitting a connection request including an identifier of the source base transceiver station to the other base transceiver station which provides the adjacent cell and which is determined to output a cell search signal whose reception power differs from that of the cell search signal outputted from the source base transceiver station by the threshold or less. Furthermore, the other base transceiver station, which provides the adjacent cell and which is determined to output a cell search signal whose reception power differs from that of the cell search signal outputted from the source base transceiver station by the threshold or less, includes a means for making a request of the source base transceiver station to transfer the packet destined for the mobile node to the other base transceiver station, and the source base transceiver station includes: a means for transferring the packet destined for the mobile node to the other base transceiver station in response to the packet transfer request from the other base transceiver station using the routing means, and for outputting the same packet to the local station's transmitting unit using the routing means so as to transmit a radio signal associated with the packet from the source base transceiver station towards the mobile node; a means for transmitting the radio signal based on the primary cell/non-primary cell specification bit to the mobile node when the local station is a primary cell, and for transmitting no radio signal to the mobile node when the local station is a non-primary cell; and a means for allowing only the source base transceiver station itself to store the transport blocks into which the packet is converted in the temporary memory in order to resend the packet to the mobile node.

Therefore, the present invention offers an advantage of being able to prevent congestions of the IP network and any loss of packets from occurring due to updating of binding and route changing, which are caused by a movement of the mobile node, without degradation in the radio line quality, thereby implementing distribution of traffic via the IP network.

A mobile communications system in accordance with the present invention includes: two base transceiver station apparatus according to any one of claims 9 to 11; an IP network disposed between the two base transceiver station apparatus, for connecting between the two base transceiver station apparatus; an IP backbone network which connects the IP network disposed between the two base transceiver station apparatus with another IP network; and a boundary router which connects the two base transceiver station apparatus to the IP backbone network.

Therefore, the present invention offers an advantage of being able to provide a mobile communications system which can prevent congestions of the network from occurring and can prevent any loss of packets.

A base transceiver station apparatus in accordance with the present invention includes: an analyzing means for analyzing a header of an IP packet received by the base transceiver station apparatus; a routing means for transferring the IP packet to another base transceiver station based on a route table when a result of analyzing the header by the analyzing means indicates that the IP packet is not destined for the local base transceiver station, and for transferring the IP packet to a transmitting unit of the local base transceiver station when the result of analyzing the header by the analyzing means indicates that the IP packet is destined for the local base transceiver station; a means for, when transmitting a packet to a mobile node which is communicating with the local base transceiver station, acquiring a base station control packet sent from an RNC via the routing means, and dividing and converting transmission processing information on the mobile node into plural pieces of information in units of TTI in which information is transferred between L1 and MAC based on the base station control packet, the TTI being equal to a time interval during which information is transmitted between layers of transport block set; an error correction coding means for inputting the transport blocks into which the transmission processing information is divided and converted, and for error correction coding the transport blocks; a modulating means for inputting the coded data outputted from the error correction coding means, and for modulating the coded data; and a transmitting means for converting digital baseband data which is the modulated, coded data output by the modulation means into an analog baseband signal, for converting a frequency of the analog baseband signal to a carrier frequency, for performing a band limit on the analog baseband signal and for amplifying it so that it has desired transmission power, and for separating signals lying within a transmission frequency band and signals lying within a reception frequency band from each other using a duplexer so as to transmit the analog baseband signal having the desired transmission power, as a radio signal, to the mobile node via a transmit/receive antenna. Furthermore, the means for dividing and converting a packet into transport blocks includes: a storing means for outputting the divided and converted transport blocks to the error correction coding means at a next stage, and for storing the transport blocks in a temporary memory, another storing means for outputting the transport blocks stored in the temporary memory to the error correction coding means in response to a resending request (NACK) from the mobile node, and for storing the transport blocks in the temporary memory again; an erasing means for erasing the transport blocks which the mobile node has finished receiving from the temporary memory in response to an acknowledgment signal (ACK) indicating the reception of the packet from the mobile node; and a first transferring means for transferring the packet from a source base transceiver station from which the mobile node is moving to a destination base transceiver station to which the mobile node is moving while the mobile node is carrying out a handover, and each of the source and destination base transceiver stations includes: a handover means for performing a handover using SSDT so as to output the packet to the local station's error correction coding means when determining that the local station is a primary cell, and so as not to output the packet to the local station's error correction coding means when determining that the location is a non-primary cell; and a second transferring means for transferring the packet to either the local station's internal circuit block or the destination base transceiver station regardless of whether a base transceiver station which has transmitted a packet to the mobile node last time is the source base transceiver station or the destination base transceiver station so that the base transceiver station which is a primary cell now resends the packet in response to the resending request.

In addition, the mobile node includes a means for, when receiving cell search signals transmitted by two or more base transceiver stations, each of the two or more cell search signals having reception power which exceeds a predetermined threshold, determining that it can carry out communications with the two or more base transceiver stations simultaneously, and requiring higher-speed packet communications, transmitting an MIMO transmission request signal to each of the two or more base transceiver stations which have transmitted cell search signals having reception power exceeding the predetermined threshold, and each of the two or more base transceiver stations includes: a means for receiving the MIMO transmission request signal via the transmit/receive antenna thereof, and for detecting MIMO transmission request data from the error correction decoding means thereof; a means for transferring transport blocks to the two or more base transceiver stations which have transmitted cell search signals having reception power exceeding the predetermined threshold and which have IP addresses respectively corresponding to cell identifiers which are transmitted from the mobile node; a means for deriving parameters required for MIMO transmission including a coding rule, a modulation rule, and a number of pilot symbols for estimation of a transmission route via which data is to be transmitted to the mobile node based on transfer rate information which is included in the detected MIMO transmission request data and which is requested by the mobile node. Furthermore, a base transceiver station which has been communicating with the mobile node since before the MIMO transmission request is made includes a means for transferring transport blocks to a cell identifier of the base transceiver station, and for packetizing the parameters required for MIMO transmission including the encoding rule, the modulation rule, and the number of pilot symbols into packets to transmit them onto an IP network.

Therefore, the present invention offers an advantage of being able to implement MIMO transmission with good cost performance.

The base transceiver station apparatus in accordance with the present invention includes: a demodulating/calculating means for receiving a radio signal transmitted by the mobile node via the transmit/receive antenna, for separating signals lying within a transmission frequency band and signals lying within a reception frequency band from each other using a duplexer so as to amplify the received radio signal and perform a band limit on the received radio signal, for carrying out frequency conversion of the radio signal having a carrier frequency to generate an analog baseband signal, for converting the analog baseband signal into a digital baseband signal, for demodulating the digital baseband signal, and for calculating an SIR; an error correction decoding means for performing error correction decoding on the demodulated data output from the demodulating/calculating means, and for calculating a CRC; a packet generating/converting means for packetizing transport blocks which are the decoded data in units of TTI which are output by the error correction decoding means, the CRC indicating the decoded result, and an average SIR calculation result which is an average of calculation results of the SIR in units of the TTI into packets; a packet sending means for, when the mobile node is carrying out a handover to move from the local station which is a source base transceiver station to a destination base transceiver station, sending the generated packets, into which the transport blocks and so on have been converted, from the destination base transceiver station to the source base transceiver station; an output means for, in the source base transceiver station, acquiring the packets sent to the source base transceiver station, via the routing means and the means for dividing/converting each of the sent packets into transport blocks, for comparing reliability of a transport block of each of packets received by the source base transceiver station with that of a transport block of each of the packets sent from the destination base transceiver station by comparing the calculated CRC and average SIR of each of the received packets with those of each of the packets sent from the destination base transceiver station, and for outputting selected transport blocks; an RNC transmitting means for packetizing only the transport blocks outputted by the output means, and for transmitting them to the RNC via the IP network; a detecting means for detecting a primary cell/non-primary cell specification bit contained in the data which is received from the mobile node and which is demodulated; another output means for dividing and converting a packet including the primary cell/non-primary cell specification bit into transport blocks, for storing the converted transport blocks in a temporary memory, and for outputting the converted transport blocks to an ARQ control means and a scheduling means which determine whether to resend a requested packet from the local station to the mobile node, or to transfer the requested packet to be resent to the destination base transceiver station; and a means for updating the route table based on the primary cell/non-primary cell specification bit for transfer of the requested packet to be resent to the mobile node to the destination base transceiver station. Furthermore, the error correction decoding means includes a means for detecting whether or not the decoded data includes an MIMO transmission request, when detecting the MIMO transmission request, the MIMO transmission request signal detecting unit notifies the detection to a base station control unit, the base station control unit includes a means for deriving parameters required for MIMO transmission such as a coding rule, a modulation rule, information which is to be transmitted to the mobile node for estimation of a transmission route, based on transfer rate information which is requested by the mobile node and which is included in the MIMO transmission request data, the base station control unit includes a means for generating transport blocks and a base-station-to-base-station communication message for transferring the parameters required for MIMO transmission based on identifier information indicating base transceiver stations which are determined to provide cell search signal reception power which exceeds the predetermined threshold by the mobile node as a result of performing cell search, the identifier information being contained in the MIMO transmission request data, and for packetizing and transmitting them to base transceiver stations having IP addresses which respectively correspond to identifiers of the base transceiver stations which are determined to provide cell search signal reception power which exceeds the predetermined threshold by the mobile node, and the base transceiver station apparatus includes a means for determining transport blocks which are to be transmitted to other base transceiver stations which perform MIMO transmission based on the transfer rate information included in the MIMO transmission request, and a number of the cell identifiers of the plurality of base transceiver stations.

Therefore, since the plurality of base transceiver stations can divide each packet into plural parts and transmit them to the mobile node, the present invention offers an advantage of being able to implement MIMO transmission with good cost performance.

In the base transceiver station apparatus in accordance with the present invention, each of the other base transceiver stations which perform MIMO transmission includes a means for, in the base station control unit which manages control of the base transceiver station, analyzing a base-station-to-base-station message from packets received from a base transceiver station which has been communicating with the mobile node since before the MIMO transmission request is made, and the base station control unit includes a means for controlling the error correction coding means and modulating means of the local station, based on MIMO transmission parameters contained in the base-station-to-base-station message, to carry out MIMO transmission.

Therefore, since the plurality of base transceiver stations can divide each packet into plural parts and transmit them to the mobile node, the present invention offers an advantage of being able to implement MIMO transmission with good cost performance.

A mobile communications system in accordance with the present invention includes: two base transceiver station apparatus according to any one of claims 15 to 17; an IP network disposed between the two base transceiver station apparatus, for connecting between the two base transceiver station apparatus; an IP backbone network which connects the IP network disposed between the two base transceiver station apparatus with another IP network; and a boundary router which connects the two base transceiver station apparatus to the IP backbone network.

Therefore, the present invention offers an advantage of being able to provide a mobile communications system which can prevent congestions of the network from occurring and can prevent any loss of packets.

PREFERRED EMBODIMENTS OF THE INVENTION

In order to explain the invention in greater detail, the preferred embodiments of the invention will be explained below with reference to the accompanying figures.

Embodiment 1

Figure 1:
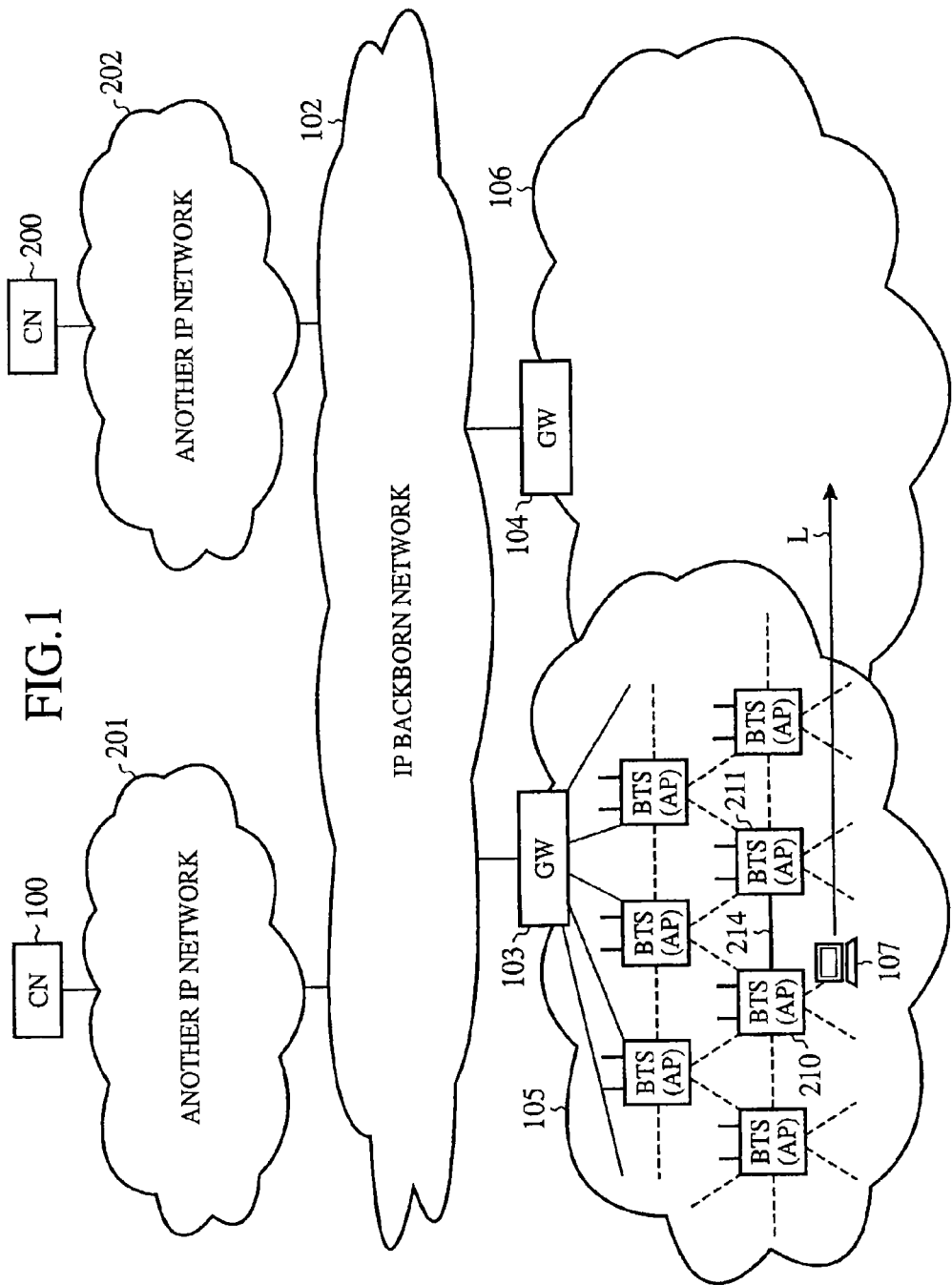
FIG. 1 is a diagram showing the structure of a mobile communications system in accordance with embodiments 1 to 3 of the present invention.
Figure 2:
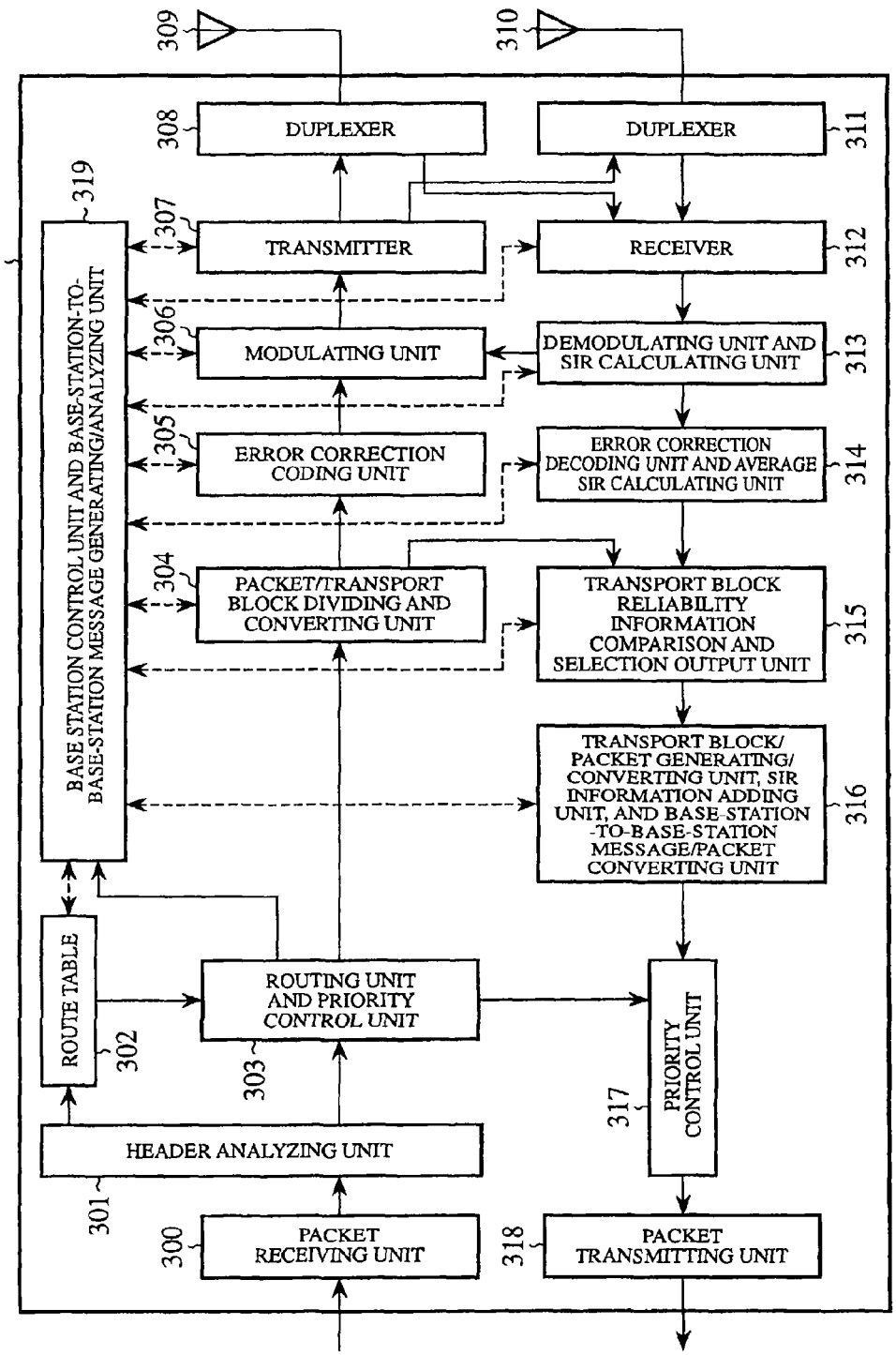
FIG. 2 is a diagram showing the structure of a base transceiver station which constitutes the mobile communications system in accordance with embodiment 1 of the present invention.
Figure 3:
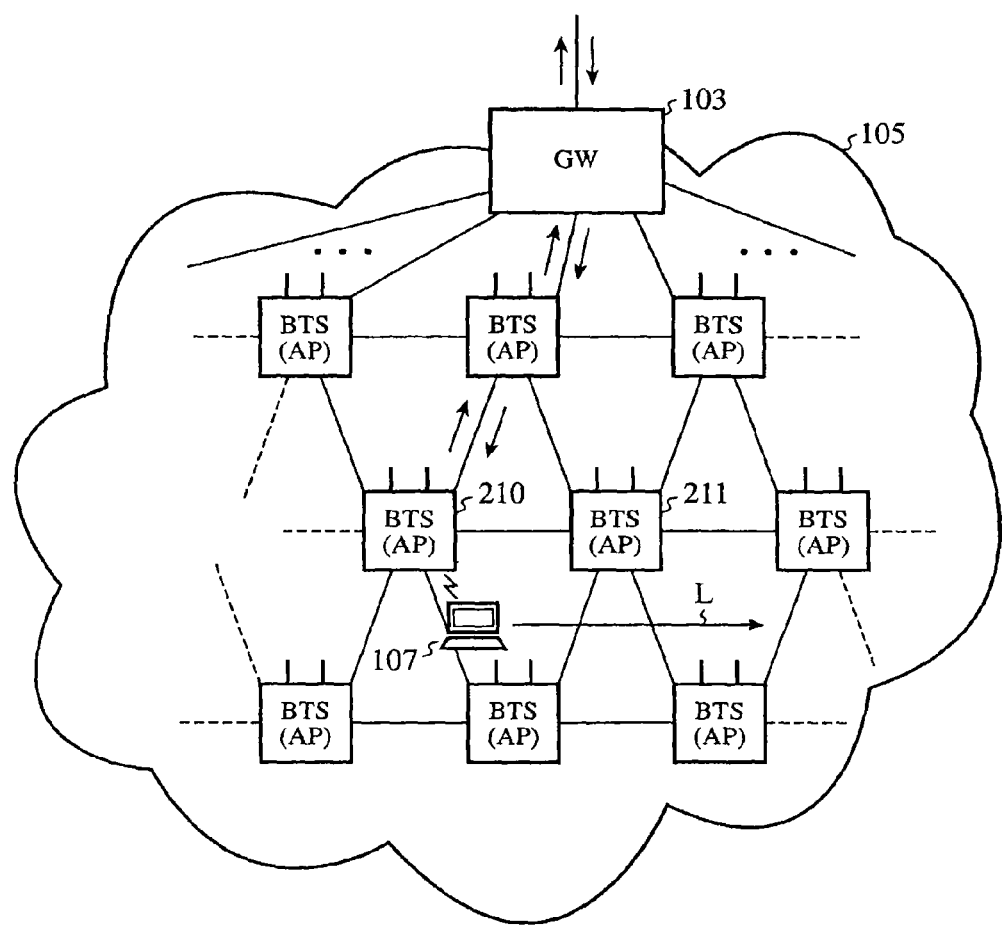
FIG. 3 is a diagram showing the operation of the mobile communications system in accordance with embodiment 1 of the present invention.
Figure 4:
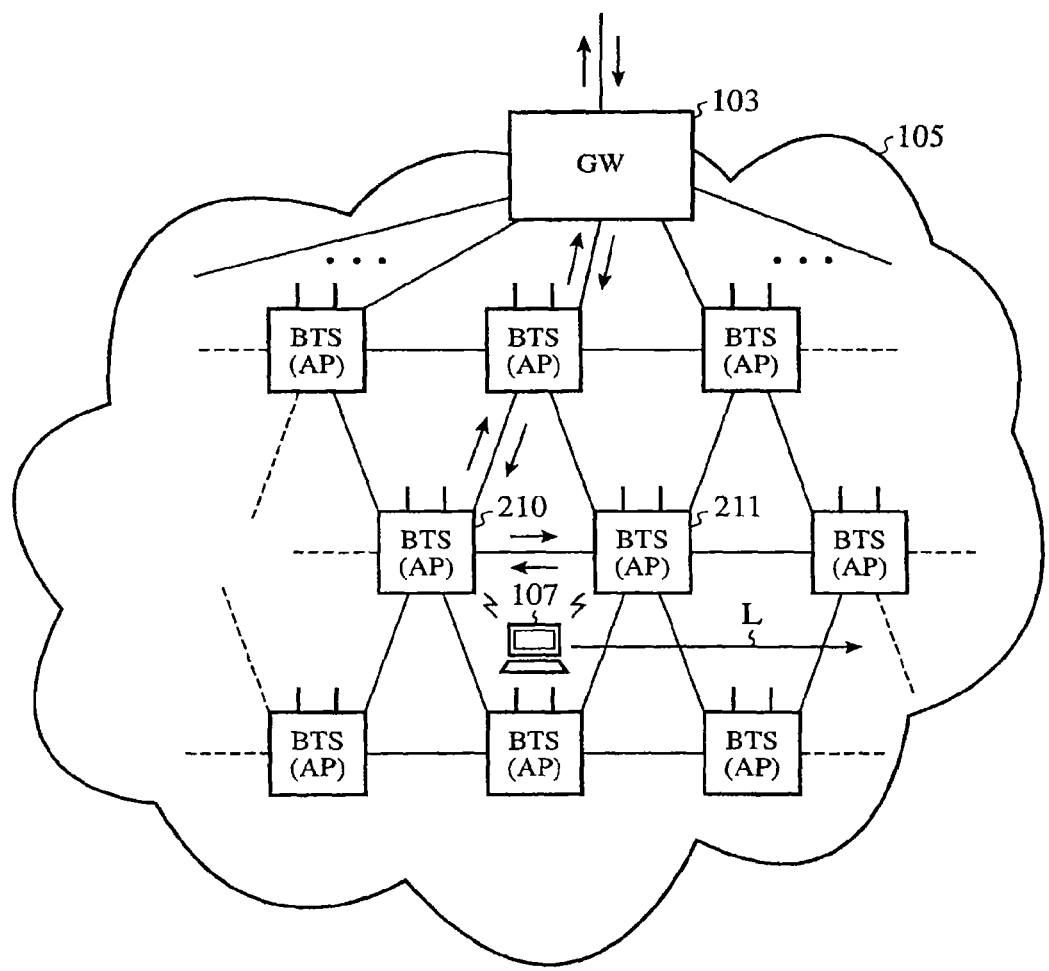
FIG. 4 is a diagram showing the operation of the mobile communications system in accordance with embodiment 1 of the present invention.
Figure 5:
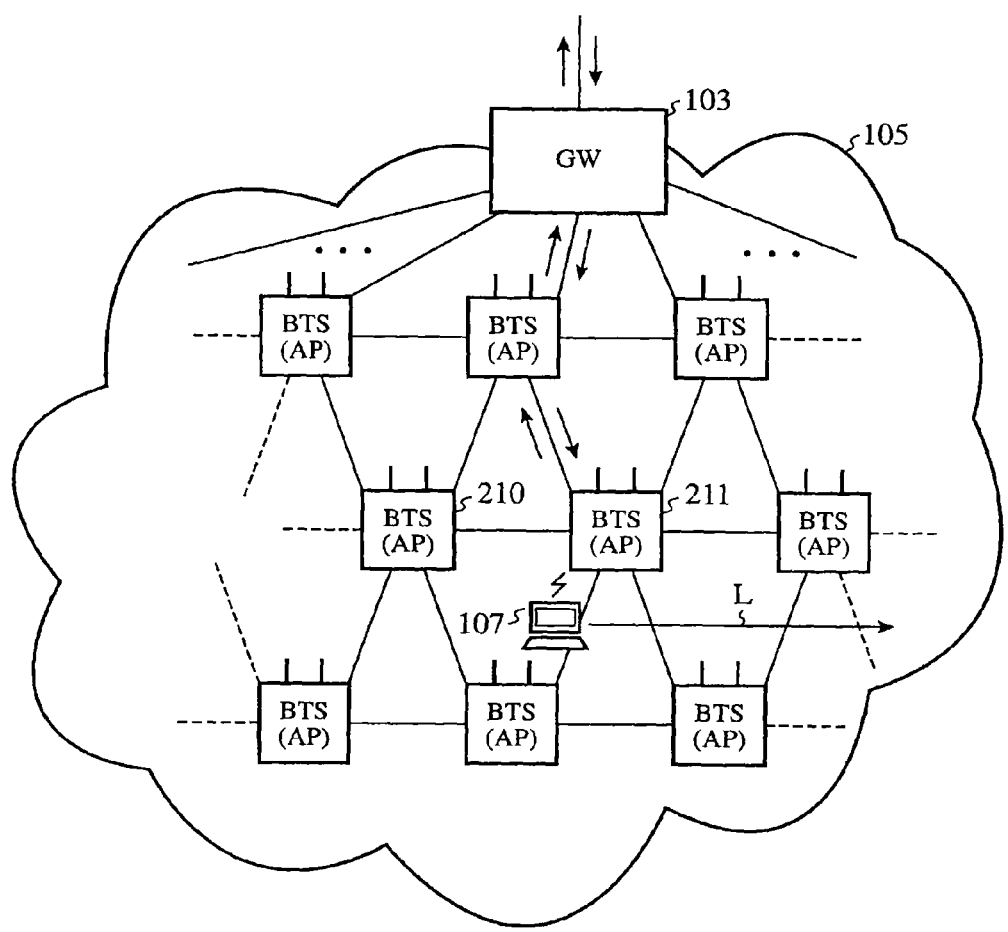
FIG. 5 is a diagram showing the operation of the mobile communications system in accordance with embodiment 1 of the present invention.

Embodiment 1 of the present invention will be now described hereafter with reference to FIGS. 1 to 5. FIG. 1 is a diagram showing the structure of a mobile communications system in accordance with embodiment 1 of the present invention, and FIG. 2 is a diagram showing the structure of a base transceiver station which constitutes the mobile communications system in accordance with this embodiment 1. FIGS. 3 to 5 are diagrams showing the operation of the mobile communications system in accordance with this embodiment 1.

As shown in FIG. 1, the mobile communications system in accordance with this embodiment 1 is provided with a global internet (i.e., an IP backbone network) 102 which is also connected to another IP network 201 (or 202) to which a communications-partner node 100 (or 200) with which a mobile node (Mobile Node) 107 is communicating belongs, a first boundary router (Gateway) 103 and a second boundary router (Gateway) 104 which form a boundary between the IP backbone network 102 and a first domain (i.e., an IP network) 105, and a boundary between the IP backbone network 102 and a second domain (i.e., an IP network) 106, respectively, base transceiver stations 210 and 211 which are arranged in the IP network 105, and which serve as access points which carry out wireless communications with the mobile node 107, and an IP network 214 placed between the base transceiver station 210 and the base transceiver station 211.

For simplicity's sake, the mobile communications system includes the two IP networks and the two boundary routers. The number of IP networks and the number of boundary routers which the mobile communications system has is not limited to two as a matter of course.

As shown in FIG. 2, each of the base transceiver stations 210 and 211 which constitute the mobile communications system in accordance with embodiment 1 is provided with a packet receiving unit 300, a header analyzing unit 301 for analyzing a basic header and an extended header of each packet received via the packet receiving unit 300, a route table 302 which is referred to in order to change a route via which packets are to be relayed and transferred based on a route control header which is determined to be included in the analyzed extended header by the header analyzing unit 301, and a routing unit and priority control unit 303 for relaying and transferring each received packet to either a processing block included in the local base transceiver station or another base transceiver station based on the route table 302, and for making it possible to perform routing on packets by giving a higher priority to packets which request real-time processing, such as packets about voice, than to other packets, based on a priority flow label contained in the basic header.

Each of the base transceiver stations 210 and 211 further includes a packet/transport block dividing and converting unit 304 for dividing and converting each packet which is to be transmitted to the mobile node 107 which carries out radiocommunications with the base transceiver station 210 or 211 into transport blocks which are data units which are processed by a first radiocommunications layer, an error correction coding unit 305 for generating error correction codes and a modulating unit 306 for carrying out modulation in order to acquire a desired radio line quality, and a transmitter 307 for converting a digital baseband signal which is an output signal from the modulating unit 306 into an analog baseband signal, for converting the frequency of this analog baseband signal to a carrier frequency, for performing a band limit on the analog baseband signal, and for amplifying the analog baseband signal so that it has desired transmission power.

Each of the base transceiver stations 210 and 211 further includes a duplexer 308 connected to a transmit/receive antenna 309, the transmitter 307, and a receiver 312, for separating signals lying within a transmission frequency band and signals lying within a reception frequency band from each other, a duplexer 311 connected to a transmit/receive antenna 310, the receiver 312, and the transmitter 307, for separating signals lying within a transmission frequency band and signals lying within a reception frequency band from each other, and the receiver 312 for amplifying a received signal in a reception frequency band, for performing a band limit on the signal, for carrying out frequency conversion of this reception frequency band signal having a carrier frequency so as to obtain an analog baseband signal, and for converting this analog baseband signal into a digital baseband signal.

Each of the base transceiver stations 210 and 211 further includes a demodulating unit and SIR calculating unit 313 for demodulating the digital baseband signal to generate the baseband signal transmitted from the mobile node 107, and for calculating a reception SIR, an error correction decoding unit and average SIR calculating unit 314 for making an error correction to the demodulated data which can include an error, and an average SIR calculating unit 314 for calculating an average SIR in units of TTI (Transmission Time Interval) which is a time unit in which data is simultaneously transmitted between L1 and MAC via an identical transport channel, and which is a time interval during which data is transmitted between layers of transport block set.

Each of the base transceiver stations 210 and 211 also includes a transport block reliability information comparison and selection output unit 315 for comparing a CRC result and an average SIR which accompany transport block data contained in the payload of each packet destined for the same mobile node, which is received from another base transceiver station via the packet receiving unit 300, header analyzing unit 301, routing/priority control unit 303, and packet/transport block dividing and converting unit 304, with the CRC result and average SIR which are obtained by the error correction decoding unit and average SIR calculating unit 314 from the signal received via the local station's receiver, and for selectively outputting transport blocks with a higher degree of reliability.

Each of the base transceiver stations 210 and 211 also includes a transport block/packet generating/converting unit and SIR information adding unit 316 for generating a packet from the selected transport blocks, i.e., for converting the selected transport blocks into a packet, and for adding the average SIR calculation result information to the packet, and a priority control unit 317 for controlling a packet transmitting unit so as to cause it to transmit the packet onto a corresponding IP network on a priority basis when the output data of the transport block/packet generating/converting unit and SIR information adding unit 316 are a packet which requests real time processing, such as a voice packet, or when receiving a packet received from another base transceiver station from the routing unit/priority control unit 303 and relaying and transferring the packet.

Each of the base transceiver stations 210 and 211 further includes the packet transmitting unit 318 for transmitting packets which are thus processed onto the IP network, and a base station control unit 319 for receiving base station control data from an RNC from the routing unit/priority control unit 303, and for controlling the component blocks designated by the reference numerals 304 to 307 and 312 to 315 based on this base station control data.

Next, the operation of each base transceiver station apparatus and mobile communications system in accordance with this embodiment of the present invention will be explained.

Assume that in FIG. 1, the mobile node 107 is communicating with the communications-partner node 100 via the base transceiver station 212 first, and will move in a direction shown by an arrow L in the figure.

A case where the mobile node 107 is staying in a cell under control of the base transceiver station 210 will be explained hereafter. A route via which packets are transmitted to and from the mobile node 107 at this time is shown in FIG. 3.

Packets transmitted from the communications-partner node 100 which is communicating with the mobile node 107 reaches the IP network 105 in which the mobile node 107 is staying via the other IP network 201 to which the communications-partner node 100 is connected, the IP backbone network 102, and the Gateway 103. Each packet destined for the mobile node 107, which has reached the IP network 105, reaches the base transceiver station 210, which provides radio access for mobile nodes staying within the cell in which the mobile node 107 is staying, from the Gateway 103 via some base transceiver stations each of which has a routing means which will be mentioned later.

The operation of each of the base transceiver stations 210 and 211 will be explained with reference to FIG. 2.

In the base transceiver station 210, a packet received via the packet receiving unit 300 is inputted into the header analyzing unit 301, and analysis of the basic header and extended header of the packet according to IPv6 is carried out.

When the result of the analysis shows that the packet is destined for the local station and is a control packet associated with updating of binding of the mobile node, the header analyzing unit 301 updates data for route table updating in a route table 302 which is referred to for control of a route of packets.

When determining that the packet is destined for another base transceiver station, the header analyzing unit 301 outputs this packet to the routing unit/priority control unit 303, and the routing unit/priority control unit 303 transmits the packet onto the IP network 105 via the priority control unit 317 and packet transmitting unit 318 so as to transfer the packet to the other base transceiver station based on the route table 302.

In contrast, when the header analyzing unit determines that the packet is destined for the local station and is a data packet destined for the mobile node, the routing unit/priority control unit 303 transmits the packet to the packet/transport block dividing and converting unit 304.

When the header analyzing unit determines that the packet is destined for the local station and is a base station control packet for radiocommunications which is associated with a data packet destined for the mobile node, the routing unit/priority control unit 303 transmits the packet to the base station control unit and base-station-to-base-station message generating/analyzing unit 319.

When the header analyzing unit 301 determines that the packet is a packet which requests real time processing, such as a voice packet, from priority information and a flow label included in the basic header of the packet, the routing unit/priority control unit 303 and priority control unit 317 give a higher priority to the packet than to any other packets so that it gets ahead of any other packets, and perform a controlling operation to output the packet to either of the base station control unit and base-station-to-base-station message generating/analyzing unit 319, packet/transport block dividing and converting unit 304, and priority control unit 317, which are processing blocks which are stages located behind the routing unit/priority control unit 303.

When a base station control packet for controlling radiocommunications with the mobile node 107 is inputted to the base station control unit and base-station-to-base-station message generating/analyzing unit 319, the base station control unit and base-station-to-base-station message generating/analyzing unit 319 establishes parameters required for transmission processing which is performed based on the base station control packet by the packet/transport block dividing and converting unit 304, error correction coding unit 305, modulating unit 306, transmitter 307, and so on. The base station control unit and base-station-to-base-station message generating/analyzing unit 319 also establishes parameters required for reception processing which is performed by the receiver 312, demodulating unit and SIR calculating unit 313, error correction decoding unit and average SIR calculating unit 314, transport block reliability information comparison and selection output unit 315, transport block/packet generating/converting unit and SIR information adding unit 316, and so on.

When a data packet destined for the mobile node is inputted into the packet/transport block dividing and converting unit 304, the packet/transport block dividing and converting unit 304 carries out division and conversion of the packet into transport blocks based on control parameters, such as the number of transport blocks defined in units of TTI which is a unit in which data is simultaneously transferred between L1 and MAC via an identical transport channel, and a transport block size per transport block, which are established for the mobile node 107 by the base station control unit and base-station-to-base-station message generating/analyzing unit 319.

While outputting the divided and converted transport blocks to the error correction coding unit 305, when the mobile node under communications is performing a handover and the local station is a source base transceiver station from which the mobile node is moving, the packet/transport block dividing and converting unit 304 outputs them to the transport block reliability information comparison and selection output unit which will be mentioned later, for comparing the payload of a packet transmitted thereto, via the packet receiving unit 300, header analyzing unit 301, routing and priority control unit, from a destination base transceiver station to which the mobile node is moving, the payload including transport blocks, a CRC showing the reliability of the transport blocks, and an average SIR, with the payload output from the error correction decoding unit and average SIR calculating unit 314 of the local station, and for selectively outputting transport blocks with a higher degree of reliability, so as to implement a soft handover.

On the other hand, the error correction coding unit 305 to which transport blocks to be transmitted to the mobile node 107 are inputted performs error correction coding on the transport blocks based on coding rules, such as a coding rate and a coding type, which are established for the mobile node 107 by the base station control unit and base-station-to-base-station message generating/analyzing unit 319, and then outputs the coded data to the modulating unit 306.

When receiving the coded data, the modulating unit 306 modulates the coded data based on modulation rules, such as a pilot bit pattern required for the mobile node to estimate a transmission route, and a modulating method, which are established for the mobile node 107 by the base station control unit and base-station-to-base-station message generating/analyzing unit 319, and outputs the modulated data to the transmitter 307 as a digital baseband signal.

When receiving the digital baseband signal, the transmitter 307 converts this digital baseband signal into an analog baseband signal, and frequency-converts the analog baseband signal so that it has a carrier frequency, amplifies the analog baseband signal so that it has desired transmission power, and performs a band limit on the analog baseband signal so that it has a frequency which falls within a transmission frequency band, based on carrier frequency information and so on which are established for the mobile node 107 by the base station control unit and base-station-to-base-station message generating/analyzing unit 319. The transmitter 307 then outputs the analog baseband signal to the duplexers 308 and 311 which are the next stages.

Radio transmission signals outputted from the duplexers 308 and 311 are transmitted to the mobile node via the transmit/receive antennas 309 and 310, respectively.

When a packet is inputted to the priority control unit 317 from the routing unit/priority control unit 303, the priority control unit 317 transmits the packet to the IP network 105 via the packet transmitting unit 318 on a priority basis if determining that the packet is a packet which requests real time processing, such as a voice packet, based on priority information and a flow label which are contained in the basic header of the packet.

When receiving a radio signal from the mobile node 107 which is received via the transmit/receive antennas 309 and 310 and the duplexers 308 and 311, the receiver 312 performs a band limit on the radio signal so that it has a frequency which falls within a reception frequency band and then amplifies it. The receiver 312 then converts the carrier frequency of the analog baseband signal into a baseband frequency based on carrier frequency information and so on which are established for the mobile node 107 by the base station control unit and base-station-to-base-station message generating/analyzing unit 319, converts the analog baseband signal into a digital baseband signal, and outputs the digital baseband signal to the demodulating unit and SIR calculating unit 313.

When receiving the digital baseband signal, the demodulating unit and SIR calculating unit 313 demodulates the digital baseband signal and calculates an SIR of the demodulated, received signal based on demodulation rules, such as data format which is a pilot bit pattern required for estimation of a transmission route, which are established for the mobile node 107 by the base station control unit and base-station-to-base-station message generating/analyzing unit 319, and outputs the demodulated data and SIR of this demodulated data to the error correction decoding unit and average SIR calculating unit 314.

When receiving the demodulated data and SIR of this demodulated data, the error correction decoding unit and average SIR calculating unit 314 decodes the demodulated data to generate decoded transport block data and calculates an average SIR in units of TTI based on decoding rules, such as a coding rate and a coding type, which are established for the mobile node 107 by the base station control unit and base-station-to-base-station message generating/analyzing unit 319, and outputs the transport block data and average SIR which are obtained thereby to the transport block reliability information comparison and selection output unit 315.

While the mobile node 107 is carrying out a soft handover, the transport block reliability information comparison and selection output unit 315 selects transport blocks having a better quality from the local station's transport blocks outputted from the error correction decoding unit and average SIR calculating unit 314 and another station's transport blocks outputted from the packet/transport block dividing and converting unit 304 according to a comparison between CRCs and average SIRs respectively showing the qualities of the local station's and other station's transport blocks, which are contained in those transport blocks, respectively, when receiving a mobile node identifier and a data number which are set thereto by the base station control unit and base-station-to-base-station message generating/analyzing unit 319, and outputs the selected transport blocks to the packet/transport block generating/converting unit 316 at the next stage.

In contrast, when no mobile node identifier and no data number are set thereto, the transport block reliability information comparison and selection output unit 315 determines that there is no necessity for comparison and selection, and outputs the local station's transport blocks outputted from the error correction decoding unit and average SIR calculating unit 314 to the packet/transport block generating/converting unit 316 at the next stage, just as they are.

The packet/transport block generating/converting unit 316 sets the transport blocks transmitted thereto and the CRC incidental to these transport blocks as a payload, generates a basic header and an extended header which are compliant with IPv6 based on a transmission destination address, a transmission source address, priority information, a flow label, an authentication header, etc. which are established by the base station control unit and base-station-tobase-station message generating/analyzing unit 319, packetizes these plural pieces of information into packets, and outputs the packets to the priority control unit 317 at the next stage.

When receiving these packets, the priority control unit 317 gives a higher priority to packets which request real time processing, such as voice packets, than to best effort packets based on the priority information and flow label which are contained in the basic header, and outputs the packets to the packet transmitting unit 318 at the next stage, and the packet transmitting unit 318 sends out them onto the IP network.

Next, an explanation will be made as to a soft handover in a case where the mobile node 107 is moving from a cell which is under control of the base transceiver station 210 to another cell which is under control of the base transceiver station 211. A transmission route via which packets are transmitted at this time is shown in FIG. 4.

As defined by, for example, 3GPP, when a difference between the reception power of a cell search signal (e.g., CPICH: Common Pilot Channel which is defined by 3GPP) for the cell of the base transceiver station 210 which is communicating with the mobile node 107, and the reception power of a cell search signal for the cell of the base transceiver station 211, which is one of cells adjacent to the cell of the base transceiver station 210, falls within a threshold which is predetermined in the system, the mobile node 107 transmits a connection request having the identifier of the base transceiver station 210 (i.e., the source base transceiver station) to which the mobile node 107 is connected at first to the other base transceiver station 211 (i.e., the destination base transceiver station) having an adjacent cell which has been determined to have a reception power difference equal to or smaller than the above-mentioned threshold so as to improve the reception quality of the mobile node 107 in the cell boundary and carry out non-discontinuous communications.

In the base transceiver station 211, the base station control unit and base-station-to-base-station message generating/analyzing unit 319 detects the connection request byway of the transmit/receive antennas 309 and 310, duplexers 308 and 311, receiver 312, demodulating unit and SIR calculating unit 313, error correction decoding unit, and average SIR calculating unit 314.

When the base station control unit and base-station-to-base-station message generating/analyzing unit 319 detects the connection request having the identifier of the base transceiver station 210, the base transceiver station 211 generates a base-station-to-base-station message which makes a request of the base transceiver station 210 to transfer packets destined for the mobile node 107 to the base transceiver station 211 by using the base station control unit and base-station-to-base-station message generating/analyzing unit 319, and sends out the base-station-to-base-station message packets onto the IP network 105 by way of the base station control unit and base-station-to-base-station message generating/analyzing unit 319, transport block/packet generating/converting unit and SIR information adding unit 316, priority control unit 317, and packet transmitting unit 318.

The base transceiver station 210 receives the base-station-to-base-station message packets by way of the packet receiving unit 300, header analyzing unit 301, routing unit and priority control unit 303, and base station control unit and base-station-to-base-station message generating/analyzing unit 319, and, when determining that the message indicates a request of transfer of IP packets as a result of analysis of the message, updates the route table 302 so that the packets destined for the mobile node 107 are transferred to the local station's packet/transport block dividing and converting unit, and a copy of the packets is also transferred to the base transceiver station 211.

As a result, the packets destined for the mobile node 107 are transferred to the local station's packet/transport block dividing and converting unit, and a copy of the packets is also transferred to the base transceiver station 211 by way of the routing unit and priority control unit 303, priority control unit 317, and packet transmitting unit 318.

As a result, downlink radio signals are transmitted to the mobile node 107 from both the base transceiver station 210 and the base transceiver station 211 so that the radio quality of the mobile node 107 which is moving can be secured and non-discontinuous communications can be carried out. Conventionally, at a time of such a soft handover, packets destined for the mobile node 107 are transmitted from an RNC to both the base transceiver station 210 and the base transceiver station 211. In contrast, in accordance with this embodiment, since communications are carried out between the base transceiver station 210 and the base transceiver station 211 so that packets can be transferred between them, the occurrence of congestions of packets is limited only to local packet communications between the base transceiver station 210 and the base transceiver station 211, and network congestions can be relieved.

At the time of a soft handover, both the base transceiver station 210 and the base transceiver station 211 perform an operation of receiving a radio signal destined for the communications-partner node 100, which is transmitted from the mobile node 107.

Each of the base transceiver stations 210 and 211 obtains transport blocks, a CRC in units of TTI, and an average SIR by way of the transmit/receive antennas 309 and 310, duplexers 308 and 311, receiver 312, demodulating unit and SIR calculating unit 313, and error correction decoding unit and average SIR calculating unit 314.

Hereafter, assume that the decoded transport blocks include packet number information indicating the order of the data transmitted from the mobile node.

After performing the signal reception processing, the base transceiver station 211 causes the transport block reliability information comparison and selection output unit 315 to go inactive (i.e., controls it so that it does not perform anything) under control of the base transceiver station control unit and base-station-to-base-station message generating/analyzing unit 319, and transmits packets to each of which both a payload having transport blocks, and a CRC and an SIR, as reliability information, which accompany the transport blocks, and an IPv6 header are added, to the base transceiver station 210 by way of the transport block/packet generating/converting unit and SIR information adding unit 316, priority control unit 317, and packet transmitting unit 318. The base transceiver station 211 has obtained the transport blocks, and CRC and SIR by performing the signal reception processing on the radio signal from the mobile node 107.

The base transceiver station 210 receives each of the packets from the base transceiver station 211 by way of the packet receiving unit 300, header analyzing unit 301, routing unit and priority control unit 303, and transport block/packet dividing and converting unit 304, and delivers each of the packets to the transport block reliability information comparison and selection output unit 315.

On the other hand, the base transceiver station 210 similarly delivers transport blocks, a CRC in units of TTI, and an average SIR, which the base transceiver station 210 itself has obtained by performing its reception processing on the radio signal from the mobile node, to the local station's transport block reliability information comparison and selection output unit 315.

The transport block reliability information comparison and selection output unit 315 compares the CRCs and average SIRs which accompany the transport blocks obtained by the two base transceiver stations, respectively, with each other, selects one of the transport blocks having a higher degree of reliability, and outputs the selected transport blocks, and CRC and average SIR which accompany the selected transport blocks to the transport block/packet generating/converting unit at the next stage.

When performing the comparison processing, the transport blocks which are targets of comparison by the transport block reliability information comparison and selection output unit 315 have an identical packet number.

Thus, in accordance with embodiment 1, when the mobile node 107 is moving in the boundary between the source base transceiver station 210 and the destination base transceiver station 211 and has a radio line quality which is less than a predetermined desired level, the source base transceiver station 210 receives packets which are to be transmitted via a wireless section to the mobile node 107 from the IP network, and copies and sends out the packets onto the IP network 105 to transmit them to the destination base transceiver station 211, so as to carry out a downlink soft handover.

Furthermore, so as to carry out an uplink soft handover, the source base transceiver station 210 compares the reliability of transport blocks, which have been received thereby via a wireless section from the mobile node 107, and which are demodulated and decoded thereby, with the reliability of transport blocks which have been received via the IP network 105 from the other base transceiver station 211, packetizes the transport blocks having a higher quality into packets and transmits them to the communications-partner node according to the route table.

Since the source base transceiver station 210 thus carries out a soft handover, the system can prevent congestions of the IP network and any loss of packets from occurring due to updating of binding and route changing, which are caused by a movement of the mobile node 107, without degradation in the radio line quality, thereby implementing distribution of traffic via the IP network.

An explanation will be made as to a case where the mobile node 107 finishes moving to the cell which is under control of the base transceiver station 211, and it becomes impossible for the base transceiver station 210 to secure its communications quality. A transmission route via which packets are transmitted at this time is shown in FIG. 5.

When a CRC is determined as NG and an average SIR does not satisfy a desired value while the source base transceiver station 210 is performing a process of receiving a radio signal from the mobile node 107, the source base transceiver station 210 transmits packets of a binding updating instruction message to the destination base transceiver station 211 by way of the base-station-to-base-station message generating/analyzing unit and base station control unit 319, transport block/packet generating/converting unit 316, priority control unit 317, and packet transmitting unit 318 so that the destination base transceiver station 211 makes a request of the Gateway 103 to perform updating of binding to the mobile node 107.

When receiving the binding updating instruction, the destination base transceiver station 211 makes a request of another base transceiver station which is located on an upstream side of the network (i.e., a base transceiver station between the base transceiver station 211 and the Gateway 103) to carry out updating of the route by using a control packet. As a result, packets transmitted from the communications-partner node 100 can reach the base transceiver station 211, via the other base transceiver station, from the Gateway 103.

Embodiment 2

Figure 6:
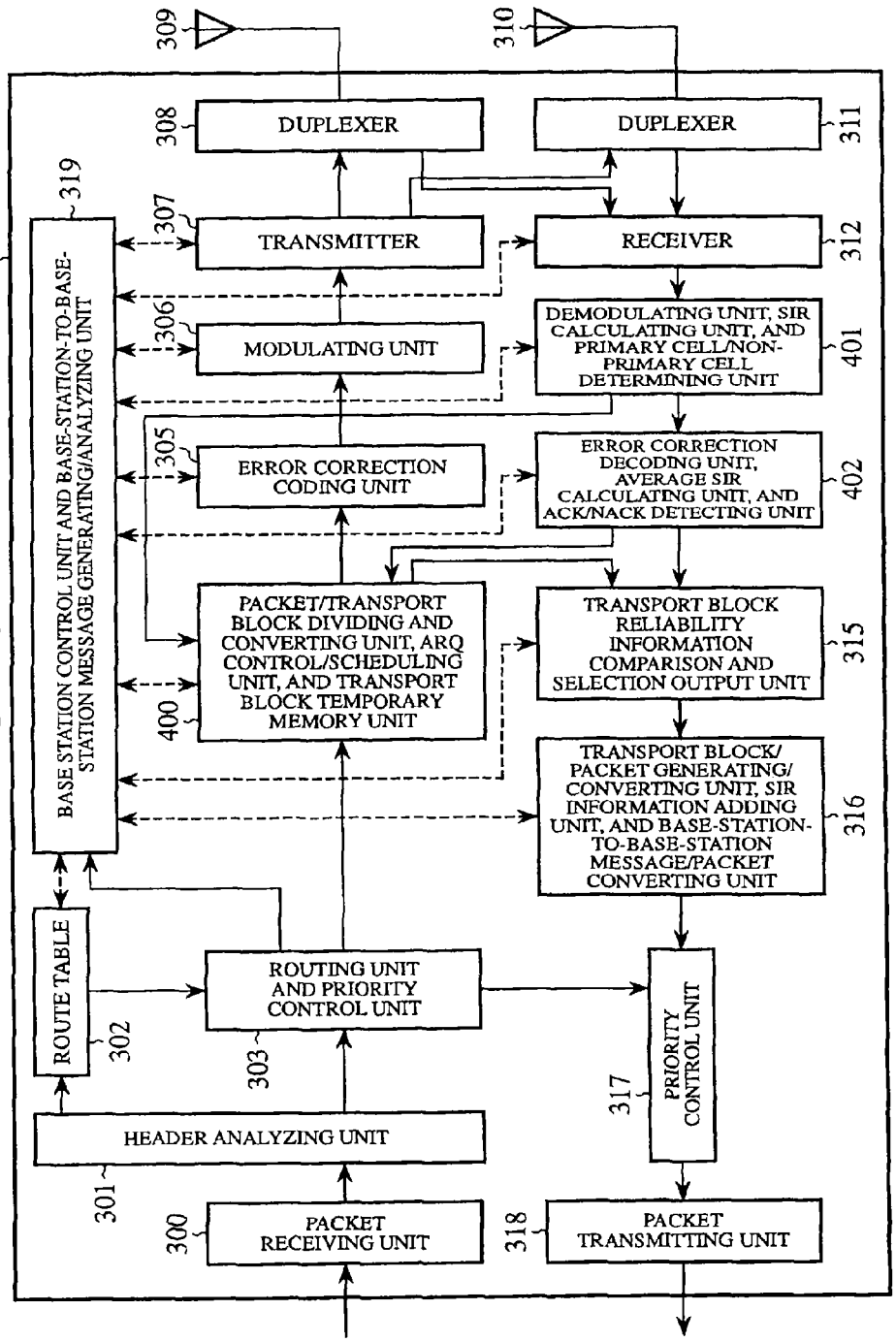
FIG. 6 is a diagram showing the structure of a base transceiver station which constitutes the mobile communications system in accordance with embodiment 2 of the present invention.
Figure 7:
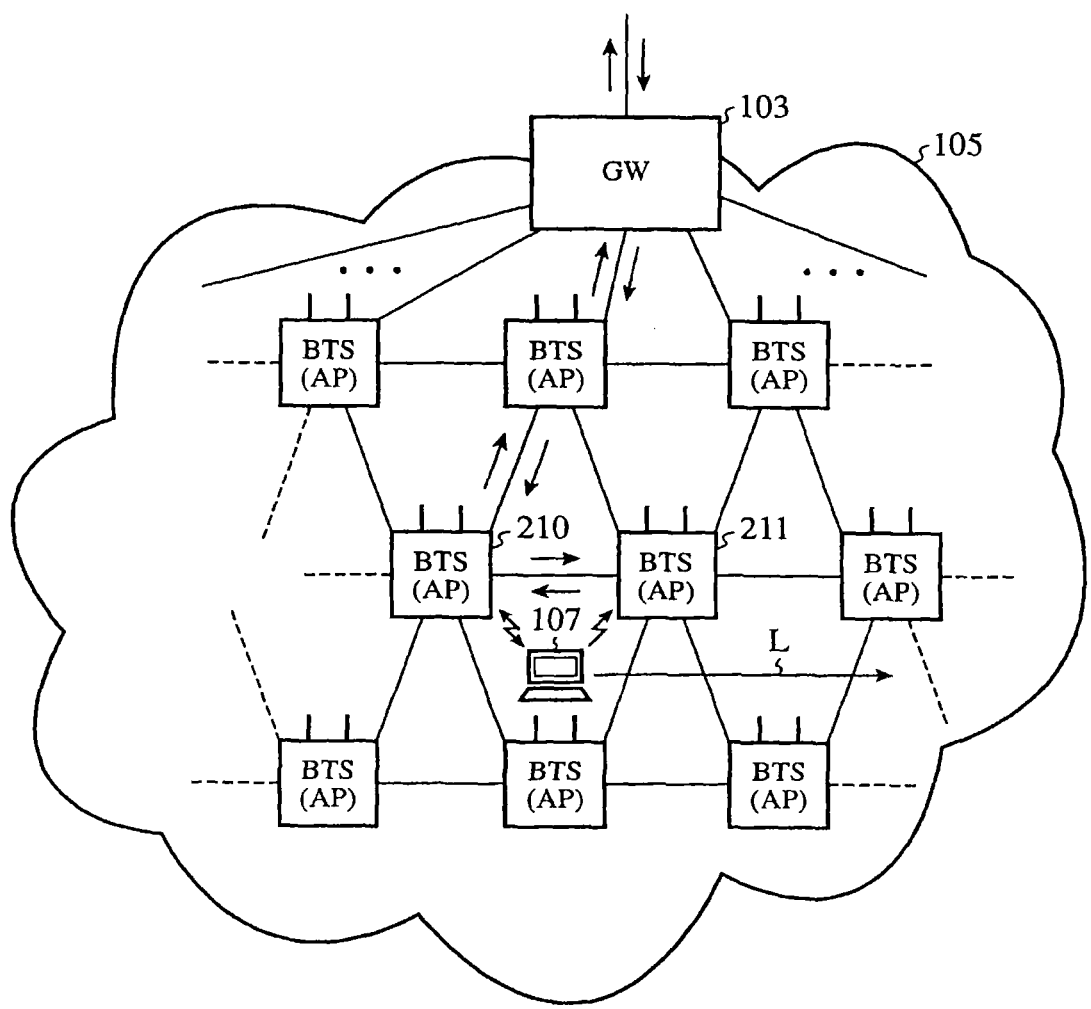
FIG. 7 is a diagram showing the operation of the mobile communications system in accordance with embodiment 2 of the present invention.
Figure 8:
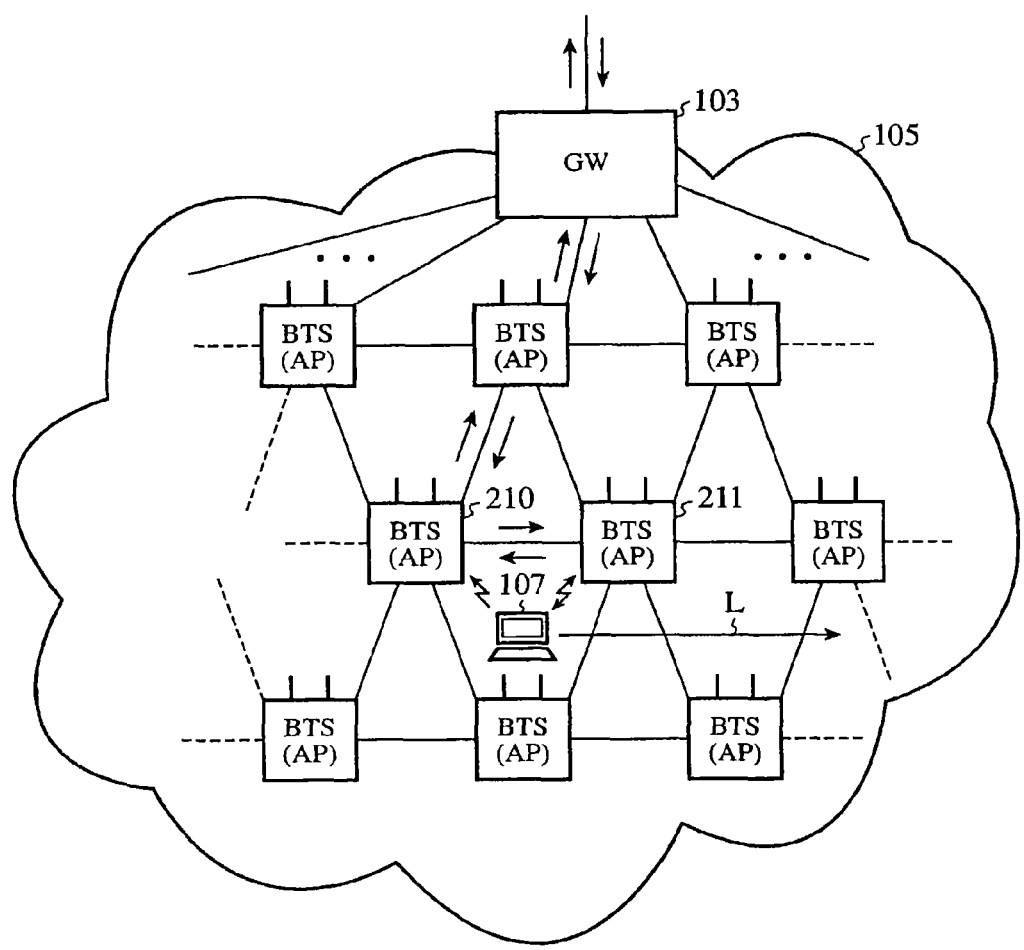
FIG. 8 is a diagram showing the operation of the mobile communications system in accordance with embodiment 2 of the present invention.

Embodiment 2 of the present invention will be now described hereafter with reference to FIGS. 1, and 6 to 8. FIG. 1 is a diagram showing the structure of a mobile communications system in accordance with embodiment 2 of the present invention, and FIG. 6 is a diagram showing the structure of a base transceiver station which constitutes the mobile communications system in accordance with this embodiment 2. FIGS. 7 and 8 are diagrams showing the operation of the mobile communications system in accordance with this embodiment 2.

In above-mentioned embodiment 1, a mobile communications system which handles IP packets and supports a soft handover and a base transceiver station which constitutes the mobile communications system are explained. In accordance with this embodiment 2, a mobile communications system as shown in FIG. 1 uses a base transceiver station as shown in FIG. 3 instead of the base transceiver station of embodiment 1, so that the mobile communications system can support a handover and ARQ according to SSDT which minimizes downlink interference power which is used by a system handling high-speed packets such as HSDPA.

The mobile communications system in accordance with embodiment 2 has the same structure as that in accordance with embodiment 1 which is explained with reference to FIG. 1, and therefore the explanation of the structure of the mobile communications system will be omitted hereafter.

Each base transceiver station which constitutes the mobile communications system in accordance with embodiment 2 is provided with a packet receiving unit 300 and a header analyzing unit 301 for analyzing the basic header and extended header of a packet received via the packet receiving unit 300, as shown in FIG. 6.

Each base transceiver station also includes a route table 302 which is referred to in order to change a route via which packets are relayed and transferred based on a route control header when the header analyzing unit 301 determines that the route control header is included in the extended header, as a result of analyzing the extended header of the packet, and a routing unit/priority control unit 303 for relaying and transferring the packet to either a processing block disposed in the local station or another base transceiver station according to the route table, and for making it possible to perform routing by giving a higher priority to packets which request real time processing, such as voice packets, than to any other packets based on priority information and a flow label contained in the basic header of the packet.

Each base transceiver station further includes a packet/transport block dividing and converting unit, ARQ control/scheduling unit, and transport block temporary storage unit 400, for dividing and converting the packet which is to be transmitted to a mobile node 107 which is carrying out radiocommunications with the base transceiver station 210 or 211 into transport blocks each of which is a data unit which is processed by a first radiocommunications layer, for, when the mobile node 107 has performed error correction decoding on a received packet, has performed error detection on the packet using an error detecting code, has detected an error, and has transmitted a NACK signal as a resending request, the base transceiver station 210 (or 211) has received this NACK signal, and resends the packet to the mobile node 107 or the mobile node 107 is carrying out a handover, transferring a transport block for instructing resending of the packet to the other base transceiver station 211 (or 210) which is performing SSDT (Site Selection Diversity Transmit Power Control) together, and for temporarily storing packet/transport block-divided, converted transport blocks which have been received via the IP network 105 until receiving an ACK/NACK signal from the mobile node 107, in order to perform ARQ.

Each base transceiver station further includes an error correction coding unit 305 for generating error correction codes and a modulating unit 306 for carrying out modulation in order to acquire a desired radio line quality, a transmitter 307 for converting a digital baseband signal which is an output signal from the modulating unit 306 into an analog baseband signal, for converting the frequency of this analog baseband signal to a carrier frequency, for performing a band limit on the analog baseband signal, and for amplifying the analog baseband signal so that it has desired transmission power, a duplexer 308 connected to a transmit/receive antenna 309, the transmitter 307, and a receiver 312, for separating signals lying within a transmission frequency band and signals lying within a reception frequency band from each other, and a duplexer 311 connected to a transmit/receive antenna 310, the receiver 312, and the transmitter 307, for separating signals lying within a transmission frequency band and signals lying within a reception frequency band from each other.

Each base transceiver station also includes the receiver 312 for amplifying a signal in a reception frequency band, performing a band limit on the signal, and carrying out frequency conversion of this reception frequency band signal having a carrier frequency so as to obtain an analog baseband signal, and for converting this analog baseband signal into a digital baseband signal, and a demodulating unit, SIR calculating unit, and primary cell/non-primary cell determining unit 401, for demodulating this digital baseband signal to generate the baseband signal transmitted from the mobile node 107, for calculating a reception SIR, and for detecting and determining a primary cell ID which is specified by the mobile node 107 based on the demodulated data, and which is a control bit used for performing SSDT.

Each base transceiver station further includes an error correction decoding unit, average SIR calculating unit, and ACK/NACK detecting unit 402 for making an error correction to the demodulated data which may include an error, for calculating an average SIR in units of TTI (Transmission Time Interval) which is a time unit in which data is simultaneously transmitted between L1 and MAC via an identical transport channel, and which is a time interval during which data is transmitted between layers of transport block set, and for detecting ACK/NACK data which indicates a response of whether the mobile node 107 has received a packet, and which serves as a request, from the mobile node 107, to make the base transceiver station 210 or 211 resend the packet.

Each base transceiver station also includes a transport block reliability information comparison and selection output unit 315 for comparing a CRC result and an average SIR which accompany transport block data contained in the payload of each packet destined for the same mobile node, which are received from another base transceiver station via the packet receiving unit 300, header analyzing unit 301, routing/priority control unit 303, and packet/transport block dividing and converting unit 400, with the CRC result and average SIR which are obtained by the error correction decoding unit, average SIR calculating unit, and ACK/NACK detecting unit 402 from the signal received via the local station's receiver, and for selectively outputting transport blocks with a higher degree of reliability.

Each base transceiver station further includes a transport block/packet generating/converting unit, SIR information adding unit, and base-station-to-base-station message/packet converting unit 316, for generating a packet from the selected transport blocks, i.e., for converting the selected transport blocks into a packet, and for adding the average SIR calculation result information to the packet, and for packetizing a base-station-to-base-station message generated by a base-station-to-base-station message generating/analyzing unit 319.

Each base transceiver station also includes a priority control unit 317 for controlling a packet transmitting unit so as to cause it to transmit the input packet onto an IP network 105 on a priority basis when the input packet is a packet which requests real time processing, such as a voice packet, or when receiving the packet received from another base transceiver station from the routing unit/priority control unit 303 and relaying and transferring the packet.

Each base transceiver station further includes the packet transmitting unit 318 for transmitting packets which are thus processed onto the IP network 105, and a base station control unit 319 for receiving base station control data from an RNC from the routing unit/priority control unit, and for controlling the component blocks designated by the reference numerals 400, 305 to 307, 312, and 401 to 403 based on this base station control data.

Next, the operation of each base transceiver station apparatus and mobile communications system in accordance with this embodiment of the present invention will be explained. As in the case of embodiment 1, assume that in FIG. 1, the mobile node 107 is communicating with the communications-partner node 100 via the base transceiver station 212 first, and will move in a direction shown by an arrow L in the figure.

A case where the mobile node 107 is staying in a cell under control of the base transceiver station 210 will be explained hereafter. A route via which packets are transmitted to and from the mobile node 107 at this time is shown in FIG. 3, as in the case of embodiment 1.

Packets transmitted from the communications-partner node 100 which is communicating with the mobile node 107 reaches the IP network 105 in which the mobile node 107 is staying via the other IP network 201 to which the communications-partner node 100 is connected, the IP backbone network 102, and the Gateway 103. Each packet destined for the mobile node 107, which has reached the IP network 105, reaches the base transceiver station 210, which provides radio access for mobile nodes staying within the cell in which the mobile node 107 is staying, from the Gateway 103 via some base transceiver stations each of which has a routing means which will be mentioned later.

The operation of each of the base transceiver stations 210 and 211 will be explained with reference to FIG. 6.

In the base transceiver station 210, a packet received via the packet receiving unit 300 is inputted into the header analyzing unit 301, and analysis of the basic header and extended header of the packet according to IPv6 is carried out.

When the result of the analysis shows that the packet is destined for the local station and is a control packet associated with updating of binding of the mobile node, the header analyzing unit 301 updates data for route table updating in the route table 302 which is referred to for control of a route of packets.

When determining that the packet is destined for another base transceiver station, the header analyzing unit 301 outputs this packet to the routing unit/priority control unit 303, and the routing unit/priority control unit 303 transmits the packet onto the IP network 105 via the priority control unit 317 and packet transmitting unit 318 so as to transfer the packet to the other base transceiver station based on the route table 302.

In contrast, when the header analyzing unit determines that the packet is destined for the local station and is a data packet destined for the mobile node, the routing unit/priority control unit 303 transmits the packet to the packet/transport block dividing and converting unit 400. On the other hand, when the header analyzing unit determines that the packet is destined for the local station and is a base station control packet for radiocommunications which is associated with a data packet destined for the mobile node, the routing unit/priority control unit 303 transmits the packet to the base station control unit and base-station-to-base-station message generating/analyzing unit 319.

When the header analyzing unit 301 determines that the packet is a packet which requests real time processing, such as a voice packet, from priority information and a flow label included in the basic header of the packet, the routing unit/priority control unit 303 and priority control unit 317 give a higher priority to the packet than to any other packets and perform a controlling operation to output the packet to either of the base station control unit and base-station-to-base-station message generating/analyzing unit 319, packet/transport block dividing and converting unit 400, and priority control unit 317, which are processing blocks which are stages located behind the routing unit/priority control unit 303.

When a base station control packet for controlling radiocommunications with the mobile node 107 is inputted to the base station control unit and base-station-to-base-station message generating/analyzing unit 319, the base station control unit and base-station-to-base-station message generating/analyzing unit 319 establishes parameters required for transmission processing which is performed based on the base station control packet by the packet/transport dividing and converting unit, ARQ control/scheduling unit, and transport block temporary memory unit 400, error correction coding unit 305, modulating unit 306, transmitter 307, and so on. The base station control unit and base-station-to-base-station message generating/analyzing unit 319 also establishes parameters required for reception processing which is performed by the receiver 312, demodulating unit, SIR calculating unit, and primary cell/non-primary cell determining unit 401, error correction decoding unit, average SIR calculating unit, and ACK/NACK detecting unit 402, transport block reliability information comparison and selection output unit 315, transport block/packet generating/converting unit, SIR information adding unit, and base-station-to-base-station message/packet converting unit 316, and so on.

When a data packet destined for the mobile node is inputted into the packet/transport block dividing and converting unit 400, the packet/transport block dividing and converting unit 400 carries out division and conversion of the packet into transport blocks based on control parameters, such as the number of transport blocks defined in units of TTI which is a unit in which data is simultaneously transferred between L1 and MAC via an identical transport channel, and a transport block size per transport block, which are established for the mobile node 107 by the base station control unit and base-station-to-base-station message generating/analyzing unit 319, and outputs the divided and converted transport blocks to the error correction coding unit 305.

Furthermore, when the mobile node under communications is performing a handover and the local station is a source base transceiver station from which the mobile node is moving, the packet/transport block dividing and converting unit 400 outputs them to the transport block reliability information comparison and selection output unit 315 which will be mentioned later, for comparing the payload of a packet transmitted thereto, via the packet receiving unit 300, header analyzing unit 301, routing unit and priority control unit 303, from the destination base transceiver station 211 to which the mobile node is moving, the payload including transport blocks, a CRC showing the reliability of the transport blocks, and an average SIR, with the payload output from the error correction decoding unit and average SIR calculating unit 402 of the local station, and for selectively outputting transport blocks with a higher degree of reliability, so as to implement an uplink soft handover.

On the other hand, the error correction coding unit 305 to which transport blocks to be transmitted to the mobile node 107 are inputted performs error correction coding on the transport blocks based on coding rules, such as a coding rate and a coding type, which are established for the mobile node 107 by the base station control unit and base-station-to-base-station message generating/analyzing unit 319, and then outputs the coded data to the modulating unit 306.

When receiving the coded data, the modulating unit 306 modulates the coded data based on modulation rules, such as a pilot bit pattern required for the mobile node to estimate a transmission route, and a modulating method, which are established for the mobile node 107 by the base station control unit and base-station-to-base-station message generating/analyzing unit 319, and outputs the modulated data to the transmitter 307 as a digital baseband signal.

When receiving the digital baseband signal, the transmitter 307 converts this digital baseband signal into an analog baseband signal, and frequency-converts the analog baseband signal so that it has a carrier frequency, amplifies the analog baseband signal so that it has desired transmission power, and performs a band limit on the analog baseband signal so that it has a frequency which falls within a transmission frequency band, based on carrier frequency information and so on which are established for the mobile node 107 by the base station control unit and base-station-to-base-station message generating/analyzing unit 319. The transmitter 307 then outputs the analog baseband signal to the duplexers 308 and 311 which are the next stages.

Radio transmission signals outputted from the duplexers 308 and 311 are transmitted to the mobile node via the transmit/receive antennas 309 and 310, respectively.

When a packet is inputted to the priority control unit 317 from the routing unit/priority control unit 303, the priority control unit 317 transmits the packet to the IP network 105 via the packet transmitting unit 318 on a priority basis if determining that the packet is a packet which requests real time processing, such as a voice packet, based on priority information and a flow label which are contained in the basic header of the packet.

When receiving a radio signal from the mobile node 107 which is received via the transmit/receive antennas 309 and 310 and the duplexers 308 and 311, the receiver 312 performs a band limit on the received radio signal so that it has a frequency which falls within a reception frequency band and then amplifies it. The receiver 312 then converts the carrier frequency of the analog baseband signal into a baseband frequency based on carrier frequency information and so on which are established for the mobile node 107 by the base station control unit and base-station-to-base-station message generating/analyzing unit 319, converts the analog baseband signal into a digital baseband signal, and outputs the digital baseband signal to the demodulating unit, SIR calculating unit, and primary cell/non-primary cell determining unit 401.

When receiving the digital baseband signal, the demodulating unit, SIR calculating unit, and primary cell/non-primary cell determining unit 401 demodulates the digital baseband signal and calculates an SIR of the demodulated, received signal based on demodulation rules, such as data format which is a pilot bit pattern required for estimation of a transmission route, which are established for the mobile node 107 by the base station control unit and base-station-to-base-station message generating/analyzing unit 319, and outputs the demodulated data and SIR of this demodulated data to the error correction decoding unit and average SIR calculating unit 402.

In addition, when performing SSDT during a downlink handover, the demodulating unit, SIR calculating unit, and primary cell/non-primary cell determining unit 401 detects a bit contained in the data transmitted by the mobile node 107 and showing the ID of a cell which provides an instruction for transmission via a downlink so as to determine whether the local station is a primary cell which is instructed to carry out the transmission via the downlink or a non-primary cell which has to stop the transmission via the downlink, and notifies the primary cell/non-primary cell determination result to the packet/transport block dividing and converting unit, ARQ control/scheduling unit, and transport block temporary memory unit 400 including the ARQ control/scheduling unit.

When receiving the demodulated data and SIR of this demodulated data, the error correction decoding unit, average SIR calculating unit, and ACK/NACK detecting unit 402 decodes the demodulated data to generate decoded transport block data and calculates an average SIR in units of TTI based on decoding rules, such as a coding rate and a coding type, which are established for the mobile node 107 by the base station control unit and base-station-to-base-station message generating/analyzing unit 319, and outputs the transport block data and average SIR which are obtained thereby to the transport block reliability information comparison and selection output unit 315.

In addition, when performing resending for HSDPA, the error correction decoding unit, average SIR calculating unit, and ACK/NACK detecting unit 402 detects ACK (=necessity of resending)/NACK (=unnecessity of resending) indicating whether the mobile node 107 requests the resending of a packet, which is contained in the decode data, and notifies this detection result to the packet/transport block dividing and converting unit, ARQ control/scheduling unit, and transport block temporary memory unit 400 including the ARQ control/scheduling unit.

While the mobile node 107 is carrying out an uplink soft handover, the transport block reliability information comparison and selection output unit 315 selects transport blocks having a better quality from the local station's transport blocks outputted from the error correction decoding unit, average SIR calculating unit, and ACK/NACK detecting unit 402 and another station's transport blocks outputted from the packet/transport block dividing and converting unit, ARQ control/scheduling unit, and transport block temporary memory 400 according to a comparison between CRCs and average SIRs respectively showing the qualities of the local station's and other station's transport blocks, which are contained in those transport blocks, respectively, when receiving a mobile node identifier and a data number which are set thereto by the base station control unit and base-station-to-base-station message generating/analyzing unit 319, and outputs the selected transport blocks to the packet/transport block generating/converting unit, SIR information adding unit, and base-station-to-base-station message/packet converting unit 316 at the next stage.

In contrast, when no mobile node identifier and no data number are set thereto, the transport block reliability information comparison and selection output unit 315 determines that there is no necessity for comparison and selection, and outputs the local station's transport blocks outputted from the error correction decoding unit, average SIR calculating unit, and ACK/NACK detecting unit 402 to the packet/transport block generating/converting unit 316 at the next stage, just as they are.

The packet/transport block generating/converting unit, SIR information adding unit, and base-station-to-base-station message/packet converting unit 316 sets the transport blocks transmitted thereto and the CRC incidental to these transport blocks as a payload, generates a basic header and an extended header which are compliant with IPv6 based on a transmission destination address, a transmission source address, priority information, a flow label, an authentication header, etc. which are established by the base station control unit and base-station-to-base-station message generating/analyzing unit 319, packetizes these plural pieces of information into packets, and outputs the packets to the priority control unit 317 at the next stage.

When receiving these packets, the priority control unit 317 gives a higher priority to packets which request real time processing, such as voice packets, than to best effort packets based on the priority information and flow label which are contained in the basic header, and outputs the packets to the packet transmitting unit 318 at the next stage, and the packet transmitting unit 318 sends out them onto the IP network 105.

Next, an explanation will be made as to a downlink handover with SSDT in a case where the mobile node 107 is moving from a cell which is under control of the base transceiver station 210 to another cell which is under control of the base transceiver station 211. A transmission route via which packets are transmitted at this time is shown in FIGS. 7 and 8.

As defined by, for example, 3GPP, when a difference between the reception power of a cell search signal (e.g., CPICH: Common Pilot Channel which is defined by 3GPP) for the cell of the base transceiver station 210 which is communicating with the mobile node 107, and the reception power of a cell search signal for the cell of the base transceiver station 211, which is one of cells adjacent to the cell of the base transceiver station 210, falls within a threshold which is predetermined in the system, the mobile node 107 transmits a connection request having the identifier of the base transceiver station 210 (i.e., the source base transceiver station) to which the mobile node 107 is connected at first to the other base transceiver station 211 (i.e., the destination base transceiver station) having an adjacent cell which has been determined to have a reception power difference equal to or smaller than the above-mentioned threshold so as to improve the reception quality of the mobile node 107 in the cell boundary and carry out non-discontinuous communications.

In the base transceiver station 211, the base station control unit and base-station-to-base-station message generating/analyzing unit 319 detects the connection request byway of the transmit/receive antennas 309 and 310, duplexers 308 and 311, receiver 312, demodulating unit, SIR calculating unit, and primary cell/non-primary cell determining unit 401, and error correction decoding unit, average SIR calculating unit, and ACK/NACK detecting unit 402.

When the base station control unit and base-station-to-base-station message generating/analyzing unit 319 detects the connection request having the identifier of the base transceiver station 210, the base transceiver station 211 generates a base-station-to-base-station message which makes a request of the base transceiver station 210 to transfer packets destined for the mobile node 107 to the base transceiver station 211 by using the base station control unit and base-station-to-base-station message generating/analyzing unit 319, and sends out the base-station-to-base-station message as base-station-to-base-station message packets onto the IP network 105 by way of the base station control unit and base-station-to-base-station message generating/analyzing unit 319, transport block/packet generating/converting unit and SIR information adding unit 316, priority control unit 317, and packet transmitting unit 318.

The base transceiver station 210 receives the base-station-to-base-station message packets by way of the packet receiving unit 300, header analyzing unit 301, routing unit and priority control unit 303, and base station control unit and base-station-to-base-station message generating/analyzing unit 319, and, when determining that the message indicates a request of transfer of IP packets as a result of analysis of the message, updates the route table 302 so that the packets destined for the mobile node 107 are transferred to the local station's packet/transport block dividing and converting unit, and a copy of the packets is also transferred to the base transceiver station 211.

As a result, the packets destined for the mobile node 107 are transferred to the local station's packet/transport block dividing and converting unit, and a copy of the packets is also transferred to the base transceiver station 211 by way of the routing unit and priority control unit 303, priority control unit 317, and packet transmitting unit 318.

By virtue of this copying/transferring operation, although the mobile node 107 can receive radio signals having the same contents from both the base transceiver station 210 and the base transceiver station 211 via their downlink links, the mobile node 107 performs a fast selection of a cell for radio-signal transmission via downlink link with SSDT. After that, only one of those base transceiver stations which constitutes the selected cell transmits a radio signal to the mobile node via its downlink link, and therefore the downlink interference power of the system is minimized.

The mobile node 107 selects a cell having a higher line quality from the cells of the two base transceiver stations. By providing a temporary ID to each of the cells and then transmitting the temporary ID of a base transceiver station which constitutes a cell which has become a primary cell to each of the cells to notify the selected cell that the cell has been selected during execution of SSDT, as defined by 3GPP, the mobile node 107 makes it possible for each base transceiver station to determine whether the local station is a primary cell or a non-primary cell. As an alternative, by providing an identifier peculiar to each base transceiver station to each base transceiver station in advance, and incorporating the identifier corresponding to the selected cell into a radio signal transmitted via an uplink, the mobile node 107 makes it possible for each base transceiver station to determine whether the local station is a primary cell or a non-primary cell.

In a case where the source base transceiver station 210 is a primary cell and the destination base transceiver station 211 is a non-primary cell, while transfer of packets destined for the mobile node 107 is always performed from the source base transceiver station 210 to the destination base transceiver station 211 during the mobile node's handover, only the source base transceiver station 210 transmits a radio signal, via a downlink link, to the mobile node and hence the destination base transceiver station 211 stops transmission of a radio signal via a downlink, as shown in FIG. 7.

In contrast, in a case where the source base transceiver station 210 is a non-primary cell and the destination base transceiver station 211 is a primary cell, while transfer of packets destined for the mobile node 107 is always performed from the source base transceiver station 210 to the destination base transceiver station 211 during the mobile node's handover, only the destination base transceiver station 211 transmits a radio signal, via a downlink link, to the mobile node and hence the source base transceiver station 210 stops transmission of a radio signal via a downlink, as shown in FIG. 8.

Conventionally, at a time of such a handover, packets destined for the mobile node 107 are transmitted from an RNC to both the base transceiver station 210 and the base transceiver station 211. In contrast, in accordance with this embodiment, since communications are carried out between the base transceiver station 210 and the base transceiver station 211 so that packets can be transferred between them, the occurrence of congestions of packets is limited only to local packet communications between the base transceiver station 210 and the base transceiver station 211, and network congestions can be relieved.

Since each of the base transceiver stations 210 and 211 can independently determine whether or not to carry out a handover, a known control delay time lapsed until the execution of a handover by an RNC since a request of the handover by a mobile node or until the stop of a handover by the RNC since the execution of the handover by the RNC can be reduced.

In a mobile communications system which assigns high-speed downlink packets, such as HSDPA, to two or more communications nodes at a high speed, when each base transceiver station is allowed to carry out an ARQ (Auto Repeat reQuest), a base transceiver station which is communicating with a mobile node needs a memory space for temporarily buffering packets to be resent to the mobile node. In contrast, in the mobile communications system in accordance with the present invention, while only the packet/transport block dividing and converting unit, ARQ control/scheduling unit, and transport block temporary memory unit 400 of the source base transceiver station 210, which includes the transport block temporary memory unit, performs temporary buffering of transport blocks to be resent to the mobile node, the destination base transceiver station 211 does not need to buffer the same transport blocks.

The mobile communications system performs a resending operation as follows.

The ACK/NACK detecting unit of the error correction decoding unit, average SIR unit, and ACK/NACK detecting unit 402 detects ACK (=necessity of resending)/NACK (=unnecessity of resending) indicating whether the mobile node 107 requests the resending of a packet and a corresponding packet number which are contained in the decoded data, and notifies these detection results to the packet/transport block dividing and converting unit, ARQ control/scheduling unit, and transport block temporary memory unit 400 including the ARQ control/scheduling unit. The packet/transport block dividing and converting unit, ARQ control/scheduling unit, and transport block temporary memory unit 400 receives the detection results, and, so as to transmit transport blocks corresponding to the packet number to the mobile node again, outputs the transport blocks to the error correction coding unit 305 when the local station which is the source base transceiver station 210 is currently a primary cell. In contrast, when the destination base transceiver station 211 is currently a primary cell, the packet/transport block dividing and converting unit, ARQ control/scheduling unit, and transport block temporary memory unit 400 transfers the packet which needs to be resent to the mobile node to the destination base transceiver station 211 via the transport block reliability information comparison and selection output unit 315, transport block/packet generating/converting unit and SIR information adding unit 316, priority control unit 317, and packet transmitting unit 318.

The destination base transceiver station 211 receives the packet which needs to be resent to the mobile node, performs transmission signal processing on the received packet to generate a radio signal, and transmits the radio signal to the mobile node 107.

When the source base transceiver station 210 performs the operation of transferring a packet to be resent to the mobile node to the destination base transceiver station 211, the transport block reliability information comparison and selection output unit 315 makes corresponding transport blocks pass therethrough without processing them and the transport block/packet generating/converting unit and SIR information adding unit 316 does not add SIR information to the packet.

In a case where the mobile communications system assigns high-speed downlink packets, such as HSDPA, to two or more communications nodes at a high speed, by carrying out such a transferring operation, the mobile communications system makes it possible for only a base transceiver station with which the mobile node has established a radio-link connection first to buffer packets to be resent to the mobile node by using a function of transferring packets between base transceiver stations, which uses the routing function, for a memory space used for temporarily buffering packets to be resent which causes a problem when each base transceiver station is allowed to perform an ARQ, thereby reducing the cost of each base transceiver station.

Regardless of whether either the source base transceiver station 210 or the destination base transceiver station 211 has transmitted the packet specified by the notified packet number, only the source base transceiver station 210 has the function of temporarily buffering and transferring the packet. Therefore, the present embodiment provides an advantage of making it possible for a base transceiver station which is currently a primary cell to transmit the packet to be resent to the mobile node, and being able to perform resending and SSDT control which are adapted to radio channels which vary with time.

On the other hand, at the time of a soft handover, both the base transceiver station 210 and the base transceiver station 211 perform an operation of receiving a radio signal destined for the communications-partner node 100, which is transmitted from the mobile node 107. A transmission route via which packets are transmitted at this time is shown in FIGS. 7 and 8.

Each of the base transceiver stations 210 and 211 obtains transport blocks, a CRC in units of TTI, and an average SIR by way of the transmit/receive antennas 309 and 310, duplexers 308 and 311, receiver 312, demodulating unit, SIR calculating unit, and primary cell/non-primary cell determining unit 401, and error correction decoding unit, average SIR calculating unit, and ACK/NACK detecting unit 402.

Hereafter, assume that the decoded transport blocks include packet number information indicating the order of the data transmitted from the mobile node.

After performing the signal reception processing, the base transceiver station 211 causes the transport block reliability information comparison and selection output unit 315 to go inactive (i.e., controls it so that it does not perform anything) under control of the base transceiver station control unit and base-station-to-base-station message generating/analyzing unit 319, and transmits packets to each of which both a payload having transport blocks, and a CRC and an SIR, as reliability information, which accompany the transport blocks, and an IPv6 header are added, to the base transceiver station 210 by way of the transport block/packet generating/converting unit and SIR information adding unit 316, priority control unit 317, and packet transmitting unit 318. The base transceiver station 211 has obtained the transport blocks, and CRC and SIR by performing the signal reception processing on the radio signal from the mobile node 107.

The base transceiver station 210 receives each of the packets from the base transceiver station 211 by way of the packet receiving unit 300, header analyzing unit 301, routing unit and priority control unit 303, and transport block/packet dividing and converting unit 304, and delivers each of the packets to the transport block reliability information comparison and selection output unit 315.

On the other hand, the base transceiver station 210 similarly delivers transport blocks, a CRC in units of TTI, and an average SIR, which the base transceiver station 210 itself has obtained by performing its reception processing on the radio signal from the mobile node, to the local station's transport block reliability information comparison and selection output unit 315.

The transport block reliability information comparison and selection output unit 315 compares the CRCs and average SIRs which accompany the transport blocks obtained by the two base transceiver stations, respectively, with each other, selects one of the transport blocks having a higher degree of reliability, and outputs the selected transport blocks, and CRC and average SIR which accompany the selected transport blocks to the transport block/packet generating/converting unit at the next stage. When performing the comparison processing, the transport blocks which are targets of comparison by the transport block reliability information comparison and selection output unit 315 have an identical packet number.

Thus, in accordance with embodiment 2, when the mobile node 107 is moving in the boundary between the source base transceiver station 210 and the destination base transceiver station 211 and has a radio line quality which is less than a predetermined desired level, the source base transceiver station 210 receives packets which are to be transmitted via a wireless section to the mobile node 107 from the IP network, and copies and sends out the packets onto the IP network to transmit them to the destination base transceiver station 211, so as to carry out a downlink soft handover, and both the source base transceiver station 210 and destination base transceiver station 211 receives and determines an ID indicating a selected cell for transmission of radio signals via a downlink from the mobile node. Only one of the base transceiver stations can carry out transmission of radio signals via a downlink, can minimize the downlink interference power, and can reduce the control delay which occurs during the handover.

On the other hand, so as to carry out an uplink soft handover, the source base transceiver station 210 compares the reliability of transport blocks, which have been received thereby via a wireless section from the mobile node 107, and which are demodulated and decoded thereby, with the reliability of transport blocks which have been received via the IP network 105 from the other base transceiver station 211, packetizes the transport blocks having a higher quality into packets and transmits them to the communications-partner node according to the route table, like that of embodiment 1. Since the source base transceiver station 210 thus carries out a soft handover, the system can prevent congestions of the IP network 105 and any loss of packets from occurring due to updating of binding and route changing, which are caused by a movement of the mobile node 107, and can implement distribution of traffic via the IP network 105 without degradation in the radio line quality.

Embodiment 3

Figure 9:
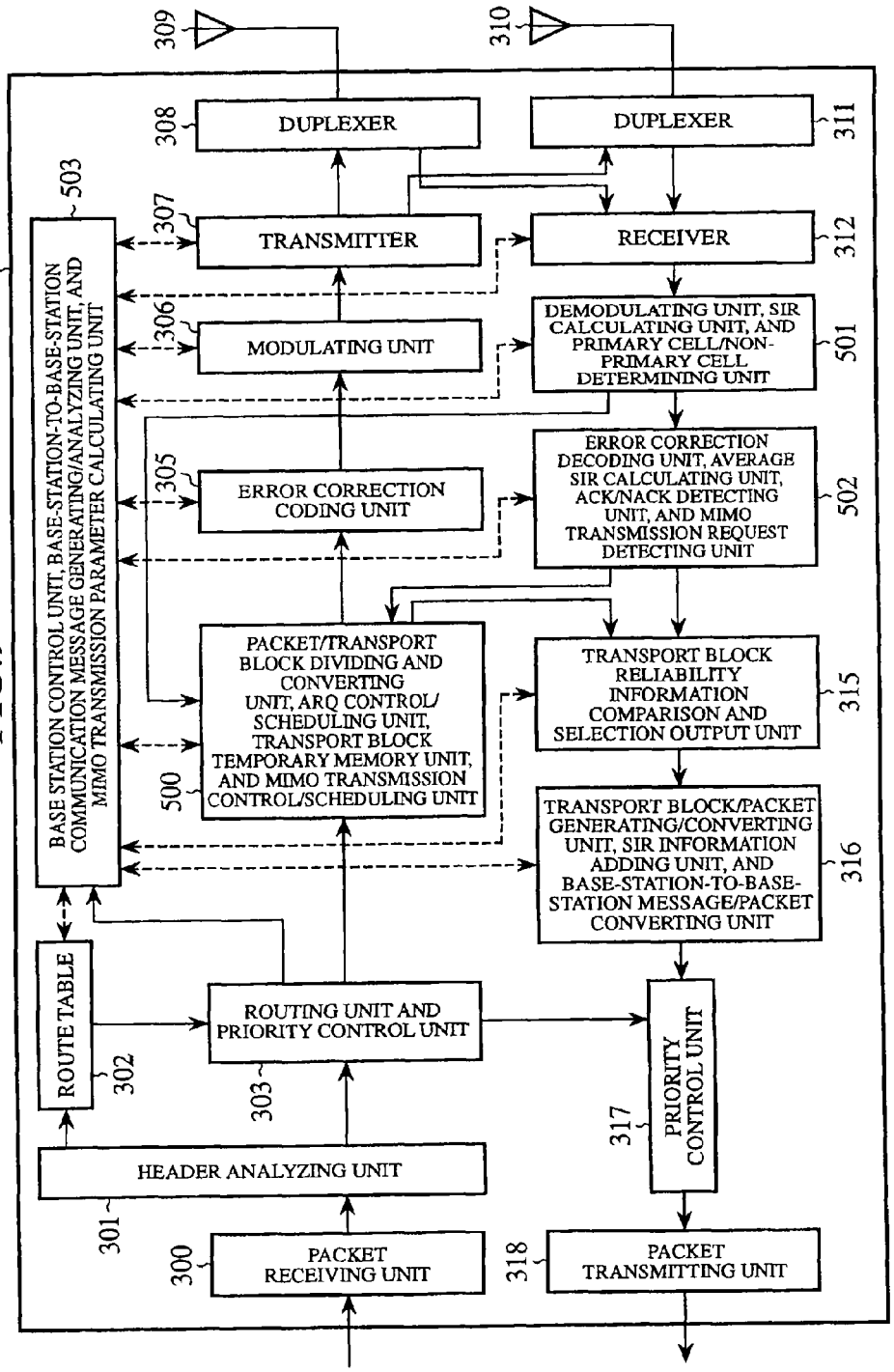
FIG. 9 is a diagram showing the structure of a base transceiver station which constitutes the mobile communications system in accordance with embodiment 3 of the present invention.
Figure 10:
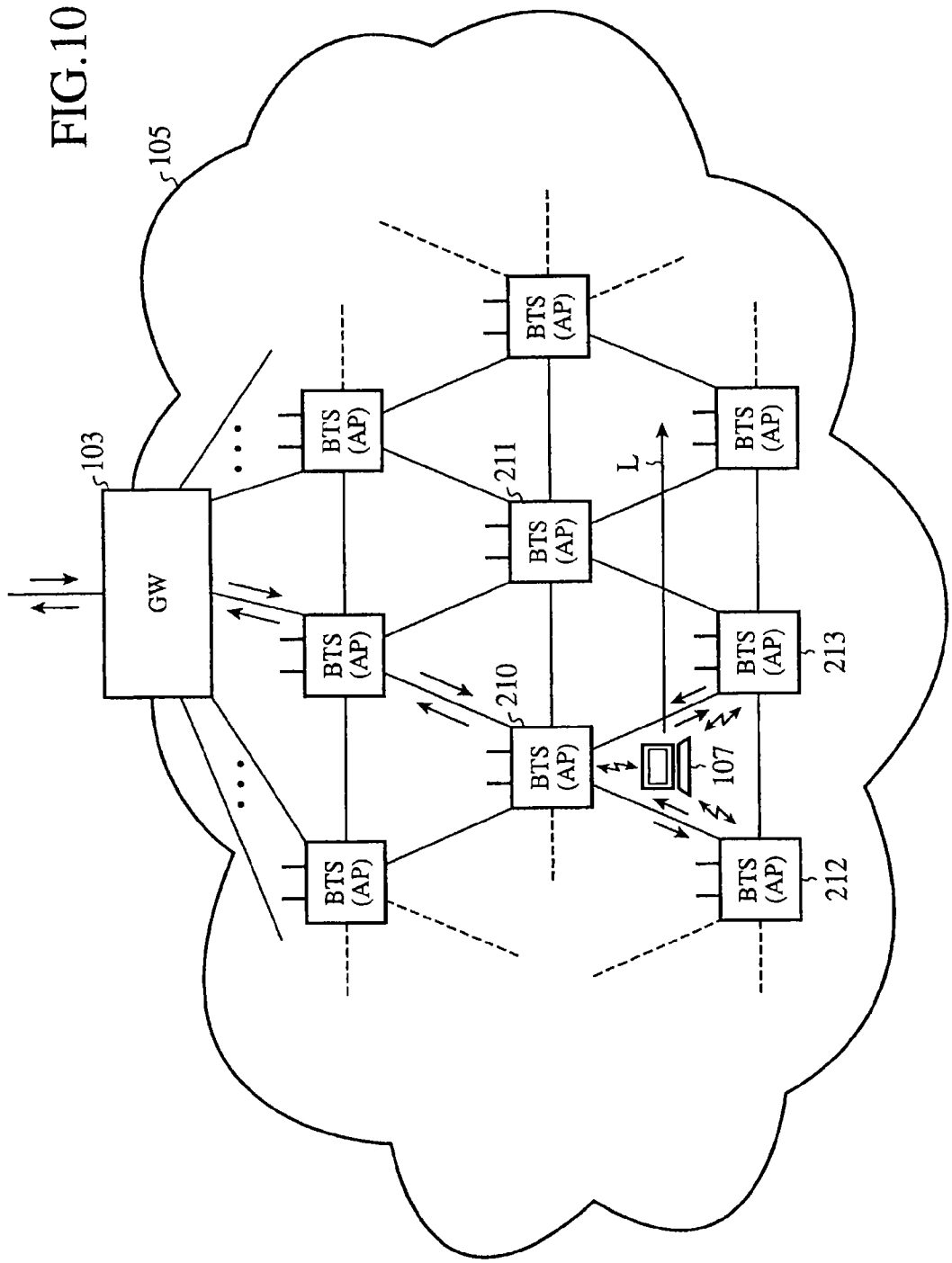
FIG. 10 is a diagram showing the operation of the mobile communications system in accordance with embodiment 3 of the present invention.
Figure 11:
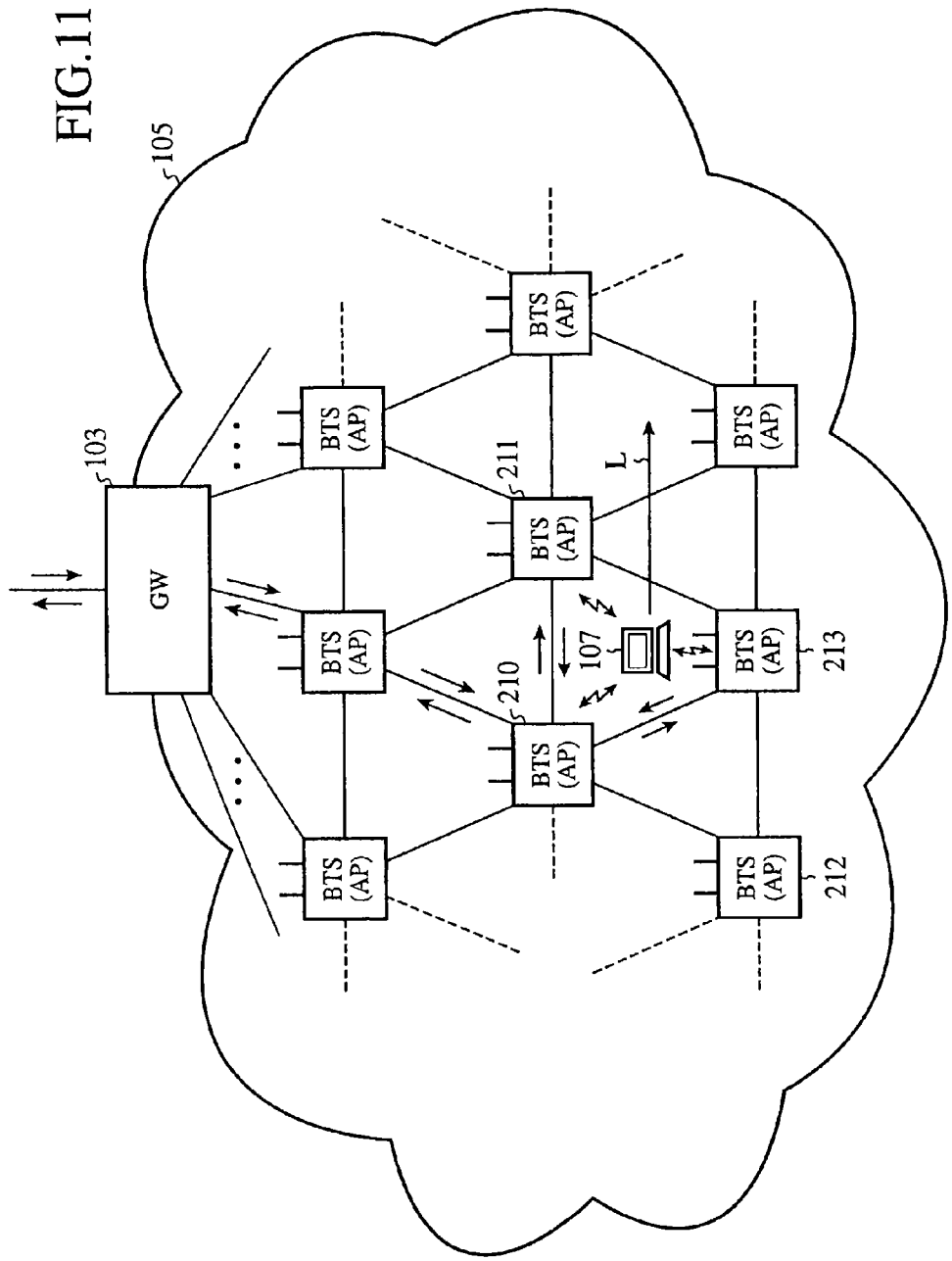
FIG. 11 is a diagram showing the operation of the mobile communications system in accordance with embodiment 3 of the present invention.

Embodiment 3 of the present invention will be now described hereafter with reference to FIGS. 1, and 9 to FIG. 1 is a diagram showing the structure of a mobile communications system in accordance with embodiment 3 of the present invention, and FIG. 9 is a diagram showing the structure of a base transceiver station which constitutes the mobile communications system in accordance with this embodiment 3. FIGS. 10 and 11 are diagrams showing the operation of the mobile communications system in accordance with this embodiment 3.

In above-mentioned embodiment 1, a mobile communications system which handles IP packets and supports a soft handover and a base transceiver station which constitutes the mobile communications system are explained. In accordance with this embodiment 3, by simultaneously transmitting plural different transmission symbols from a plurality of transmission antennas using a base transceiver station as shown in FIG. 9, instead of the base transceiver station of above-mentioned embodiment 1, the mobile communications system can make transmission symbols to become multileveled in space, and can carry out MIMO transmission so as to implement higher-speed packet communications.

Each base transceiver station which constitutes the mobile communications system in accordance with embodiment 3 is provided with a packet receiving unit 300, a header analyzing unit 301 for analyzing the basic header and extended header of a packet received via the packet receiving unit 300, and a route table 302 which is referred to in order to change a route via which packets are relayed and transferred based on a route control header when the header analyzing unit 301 determines that the route control header is included in the extended header, as a result of analyzing the extended header of the packet, as shown in FIG. 9.

Each base transceiver station also includes a routing unit/priority control unit 303 for relaying and transferring the packet to either a processing block disposed in the local station or another base transceiver station according to the route table 302, and for making it possible to perform routing by giving a higher priority to packets which request real time processing, such as voice packets, than to any other packets based on priority information and a flow label contained in the basic header of the packet.

Each base transceiver station further includes a packet/transport block dividing and converting unit, ARQ control/scheduling unit, transport block temporary storage unit, and MIMO transmission control/scheduling unit 500, for dividing and converting the packet which is to be transmitted to a mobile node 107 which is carrying out radiocommunications with the base transceiver station 210 or 211 into transport blocks each of which is a data unit which is processed by a first radiocommunications layer, for, when the mobile node 107 has performed error correction decoding on a received packet, has performed error detection on the packet using an error detecting code, has detected an error, and has transmitted a NACK signal as a resending request, the base transceiver station 210 (or 211) has received this NACK signal, and resends the packet to the mobile node 107 or the mobile node 107 is carrying out a handover, transferring a transport block for instructing resending of the packet to the other base transceiver station 211 (or 210) which is performing SSDT together, for temporarily storing packet/transport block-divided, converted transport blocks which have been received via the IP network 105 until receiving an ACK/NACK signal from the mobile node 107, in order to perform ARQ, and for, when two or more other base transceiver stations, for example, two other base transceiver stations perform MIMO transmission, transferring the transport blocks which are to be transmitted to the mobile node 107 to the other base transceiver station 211 (or 210), so as to implement an MIMO transmission method of performing different coding for every transmission antenna, and transmitting differently-coded data via transmission antennas.

Each base transceiver station further includes an error correction coding unit 305 for generating error correction codes and a modulating unit 306 for carrying out modulation in order to acquire a desired radio line quality, a transmitter 307 for converting a digital baseband signal which is an output signal from the modulating unit 306 into an analog baseband signal, for converting the frequency of this analog baseband signal to a carrier frequency, for performing a band limit on the analog baseband signal, and for amplifying the analog baseband signal so that it has desired transmission power, and a duplexer 308 connected to a transmit/receive antenna 309, the transmitter 307, and a receiver 312, for separating signals lying within a transmission frequency band and signals lying within a reception frequency band from each other.

Each base transceiver station also includes a duplexer 311 connected to a transmit/receive antenna 310, the receiver 312, and the transmitter 307, for separating signals lying within a transmission frequency band and signals lying within a reception frequency band from each other.

Each base transceiver station further includes the receiver 312 for amplifying a signal in a reception frequency band, performing a band limit on the signal, and carrying out frequency conversion of this reception frequency band signal having a carrier frequency so as to obtain an analog baseband signal, and for converting this analog baseband signal into a digital baseband signal.

Each base transceiver station also includes a demodulating unit, SIR calculating unit, and primary cell/non-primary cell determining unit 501, for demodulating this digital baseband signal to generate the baseband signal transmitted from the mobile node 107, for calculating a reception SIR, and for detecting and determining a primary cell ID which is specified by the mobile node 107 based on the demodulated data, and which is a control bit used for performing SSDT and MIMO transmission.

Each base transceiver station further includes an error correction decoding unit, average SIR calculating unit, ACK/NACK detecting unit, and MIMO transmission request detecting unit 502, for making an error correction to the demodulated data which may include an error, for calculating an average SIR in units of TTI (Transmission Time Interval) which is a time unit in which data is simultaneously transmitted between L1 and MAC via an identical transport channel, and which is a time interval during which data is transmitted between layers of transport block set, for detecting ACK/NACK data which indicates a response of whether the mobile node 107 has received a packet, and which serves as a request, from the mobile node 107, to make the base transceiver station 210 or 211 resend the packet, and for detecting an MIMO transmission request from the mobile node 107.

Each base transceiver station also includes a transport block reliability information comparison and selection output unit 315 for comparing a CRC result and an average SIR which accompany transport block data contained in the payload of each packet destined for the same mobile node, which are received from another base transceiver station via the packet receiving unit 300, header analyzing unit 301, routing/priority control unit 303, and packet/transport block dividing and converting unit 500, with the CRC result and average SIR which are obtained by the error correction decoding unit, average SIR calculating unit, ACK/NACK detecting unit, and MIMO transmission request detecting unit 502 from the signal received via the local station's receiver, and for selectively outputting transport blocks with a higher degree of reliability. Each base transceiver station further includes a transport block/packet generating/converting unit, SIR information adding unit, and base-station-to-base-station message/packet converting unit 316, for generating a packet from the selected transport blocks, i.e., for converting the selected transport blocks into a packet, and for adding the average SIR calculation result information to the packet, the transport block/packet generating/converting unit, SIR information adding unit, and base-station-to-base-station message/packet converting unit 316 further including a function of, in response to detection of an MIMO transmission request, adding a base-station-to-base-station message, such as coding rules for the other base transceiver station to carry out coding processing, and pilot information which is to be transmitted to the mobile node 107 so that the mobile node 107 can use the pilot information to estimate a transmission route, to transport blocks to be transferred to the other base transceiver station, and packetizing the transport blocks, in addition to the function described in embodiment 1 or 2.

Each base transceiver station also includes a priority control unit 317 for controlling a packet transmitting unit so as to cause it to transmit the input packet onto an IP network 105 on a priority basis when the input packet output from the packet reliability information comparison and selection output unit 316 is a packet which requests real time processing, such as a voice packet, or when receiving the packet received from another base transceiver station from the routing unit/priority control unit 313 and relaying and transferring the packet, and the packet transmitting unit 318 for transmitting packets which are thus processed onto the IP network.

Each base transceiver station further includes a base station control unit, base-station-to-base-station communication message generating/analyzing unit, and MIMO transmission parameter deriving unit 503, for, in response to detection of an MIMO transmission request, deriving MIMO transmission control parameters which are used by the local station and the other station, such as coding rules to encode data to be transmitted using the MIMO transmission method and pilot information which is to be transmitted to the mobile node 107 so that the mobile node 107 can use the pilot information to estimate a transmission route, and for adding the MIMO transmission control parameters to transport blocks which are to be transferred to the local station and the other station so as to generate a base-station-to-base-station message, for outputting the base-station-to-base-station message to the transport block/packet generating/converting unit, SIR information adding unit, and base-station-to-base-station message/packet converting unit including the base-station-to-base-station message/packet converting unit, for receiving base station control data transmitted from an RNC from the routing unit, and for controlling the configuration blocks designated by the reference numerals 500, 305 to 307, 312, 501, 502, 315, and 316 based on this base station control data.

Next, the operation of each base transceiver station apparatus and the mobile communications system in accordance with this embodiment of the present invention will be explained with reference to FIG. 9.

In operation, as in the case of embodiment 1 or 2, assume that in FIG. 1, the mobile node 107 is communicating with the communications-partner node 100 via the base transceiver station 212 first, and will move in a direction shown by an arrow L in the figure.

A case where the mobile node 107 is staying in a cell under control of the base transceiver station 210 will be explained hereafter. A route via which packets are transmitted to and from the mobile node 107 at this time is shown in FIG. 3, as in the case of embodiment 1.

Packets transmitted from the communications-partner node 100 which is communicating with the mobile node 107 reaches the IP network 105 in which the mobile node 107 is staying via the other IP network 201 to which the communications-partner node 100 is connected, the IP backbone network 102, and the Gateway 103. Each packet destined for the mobile node 107, which has reached the IP network 105, reaches the base transceiver station 210, which provides radio access for mobile nodes staying within the cell in which the mobile node 107 is staying, from the Gateway 103 via some base transceiver stations each of which has a routing means which will be mentioned later.

In the base transceiver station 210, a packet received via the packet receiving unit 300 is inputted into the header analyzing unit 301, and analysis of the basic header and extended header of the packet according to IPv6 is carried out.

When the result of the analysis shows that the packet is destined for the local station and is a control packet associated with updating of binding of the mobile node, the header analyzing unit 301 updates data for route table updating in the route table 302 which is referred to for control of a route of packets.

When determining that the packet is destined for another base transceiver station, the header analyzing unit 301 outputs this packet to the routing unit/priority control unit 303, and the routing unit/priority control unit 303 transmits the packet onto the IP network 105 via the priority control unit 317 and packet transmitting unit 318 so as to transfer the packet to the other base transceiver station based on the route table 302.

In contrast, when the header analyzing unit determines that the packet is destined for the local station and is a data packet destined for the mobile node, the routing unit/priority control unit 303 transmits the packet to the packet/transport block dividing and converting unit 500.

On the other hand, when the header analyzing unit determines that the packet is destined for the local station and is a base station control packet for radiocommunications which is associated with a data packet destined for the mobile node, the routing unit/priority control unit 303 transmits the packet to the base station control unit, base-station-to-base-station communication message generating/analyzing unit, and MIMO transmission parameter deriving unit 503.

When the header analyzing unit 301 determines that the packet is a packet which requests real time processing, such as a voice packet, from priority information and a flow label included in the basic header of the packet, the routing unit/priority control unit 303 and priority control unit 317 give a higher priority to the packet than to any other packets and perform a controlling operation to output the packet to either of the base station control unit and base-station-to-base-station communication message generating/analyzing unit 503, packet/transport block dividing and converting unit 500, and priority control unit 317, which are processing blocks which are stages located behind the routing unit/priority control unit 303.

When a base station control packet for controlling radiocommunications with the mobile node 107 is inputted to the base station control unit and base-station-to-base-station communication message generating/analyzing unit 503, the base station control unit and base-station-to-base-station message generating/analyzing unit 503 establishes parameters required for transmission processing which is performed based on the base station control packet by the packet/transport dividing and converting unit, ARQ control/scheduling unit, transport block temporary memory unit, and MIMO transmission control/scheduling unit 500, error correction coding unit 305, modulating unit 306, transmitter 307, and so on.

The base station control unit and base-station-to-base-station message generating/analyzing unit 503 also establishes parameters required for reception processing which is performed by the receiver 312, demodulating unit, SIR calculating unit, and primary cell/non-primary cell determining unit for SSDT and MIMO transmission 501, error correction decoding unit, average SIR calculating unit, ACK/NACK detecting unit, and MIMO transmission request detecting unit 502, transport block reliability information comparison and selection output unit 315, transport block/packet generating/converting unit, SIR information adding unit, and base-station-to-base-station message/packet converting unit 316, and so on.

When a data packet destined for the mobile node is inputted into the packet/transport block dividing and converting unit 500, the packet/transport block dividing and converting unit 500 carries out division and conversion of the packet into transport blocks based on control parameters, such as the number of transport blocks defined in units of TTI which is a unit in which data is simultaneously transferred between L1 and MAC via an identical transport channel, and a transport block size per transport block, which are established for the mobile node 107 by the base station control unit, base-station-to-base-station message generating/analyzing unit, and MIMO transmission parameter deriving unit 503, and outputs the divided and converted transport blocks to the error correction coding unit 305.

Furthermore, when the mobile node under communications is performing a handover and the local station is a source base transceiver station from which the mobile node is moving, the packet/transport block dividing and converting unit 500 outputs them to the transport block reliability information comparison and selection output unit 315 which will be mentioned later, for comparing the payload of a packet transmitted thereto, via the packet receiving unit 300, header analyzing unit 301, routing and priority control unit 303, from a destination base transceiver station to which the mobile node is moving, the payload including transport blocks, a CRC showing the reliability of the transport blocks, and an average SIR, with the payload output from the error correction decoding unit and average SIR calculating unit 502 of the local station, and for selectively outputting transport blocks with a higher degree of reliability, so as to implement an uplink soft handover.

On the other hand, the error correction coding unit 305 to which transport blocks to be transmitted to the mobile node 107 are inputted performs error correction coding on the transport blocks based on coding rules, such as a coding rate and a coding type, which are established for the mobile node 107 by the base station control unit, base-station-to-base-station communication message generating/analyzing unit, and MIMO transmission parameter deriving unit 503, and then outputs the coded data to the modulating unit 306.

When receiving the coded data, the modulating unit 306 modulates the coded data based on modulation rules, such as a pilot bit pattern required for the mobile node to estimate a transmission route, and a modulating method, which are established for the mobile node 107 by the base station control unit and base-station-to-base-station communication message generating/analyzing unit 503, and outputs the modulated data to the transmitter 307 as a digital baseband signal.

When receiving the digital baseband signal, the transmitter 307 converts this digital baseband signal into an analog baseband signal, and frequency-converts the analog baseband signal so that it has a carrier frequency, amplifies the analog baseband signal so that it has desired transmission power, and performs a band limit on the analog baseband signal so that it has a frequency which falls within a transmission frequency band, based on carrier frequency information and so on which are established for the mobile node 107 by the base station control unit and base-station-to-base-station communication message generating/analyzing unit 503. The transmitter 307 then outputs the analog baseband signal to the duplexers 308 and 311 which are the next stages.

Radio transmission signals outputted from the duplexers 308 and 311 are transmitted to the mobile node via the transmit/receive antennas 309 and 310, respectively.

When a packet is inputted to the priority control unit 317 from the routing unit/priority control unit 303, the priority control unit 317 transmits the packet to the IP network 105 via the packet transmitting unit 318 on a priority basis if determining that the packet is a packet which requests real time processing, such as a voice packet, based on priority information and a flow label which are contained in the basic header of the packet.

When receiving a radio signal from the mobile node 107 which is received via the transmit/receive antennas 309 and 310 and the duplexers 308 and 311, the receiver 312 performs a band limit on the received radio signal so that it has a frequency which falls within a reception frequency band and then amplifies it. The receiver 312 then converts the carrier frequency of the analog baseband signal into a baseband frequency based on carrier frequency information and so on which are established for the mobile node 107 by the base station control unit and base-station-to-base-station communication message generating/analyzing unit 503, converts the analog baseband signal into a digital baseband signal, and outputs the digital baseband signal to the demodulating unit, SIR calculating unit, and primary cell/non-primary cell determining unit used for SSDT or MIMO transmission 501.

When receiving the digital baseband signal, the demodulating unit, SIR calculating unit, and primary cell/non-primary cell determining unit used for SSDT or MIMO transmission 501 demodulates the digital baseband signal and calculates an SIR of the demodulated, received signal based on demodulation rules, such as data format which is a pilot bit pattern required for estimation of a transmission route, which are established for the mobile node 107 by the base station control unit and base-station-to-base-station message generating/analyzing unit 503, and outputs the demodulated data and SIR of this demodulated data to the error correction decoding unit and average SIR calculating unit 502.

In addition, when performing SSDT during a downlink handover, the demodulating unit, SIR calculating unit, and primary cell/non-primary cell determining unit used for SSDT or MIMO transmission 501 detects a bit contained in the data transmitted by the mobile node 107 and showing the ID of a cell which provides an instruction for transmission via a downlink so as to determine whether the local station is a primary cell which is instructed to carry out the transmission via the downlink or a non-primary cell which has to stop the transmission via the downlink, and notifies the primary cell/non-primary cell determination result to the packet/transport block dividing and converting unit, ARQ control/scheduling unit, transport block temporary memory unit, and MIMO transmission control/scheduling unit 500 including the ARQ control/scheduling unit.

Furthermore, when performing MIMO transmission via the downlink, the demodulating unit, SIR calculating unit, and primary cell/non-primary cell determining unit used for SSDT or MIMO transmission 501 detects bits contained in the data transmitted by the mobile node 107 and showing the cell IDs of two or more primary cell which are instructed to transmit signals via the downlink by the mobile node 107, and notifies the detection results to the packet/transport block dividing and converting unit, ARQ control/scheduling unit, transport block temporary memory unit, and MIMO transmission control/scheduling unit 500 including the MIMO transmission/scheduling unit and also notifies them to the base station control unit, base-station-to-base-station communication message generating/analyzing unit, and MIMO transmission parameter deriving unit 503 including the MIMO transmission parameter deriving unit and the base-station-to-base-station message generating unit.

When receiving the demodulated data and SIR of this demodulated data, the error correction decoding unit, average SIR calculating unit, ACK/NACK detecting unit, and MIMO transmission request detecting unit 502 decodes the demodulated data to generate decoded transport block data and calculates an average SIR in units of TTI based on decoding rules, such as a coding rate and a coding type, which are established for the mobile node 107 by the base station control unit, base-station-to-base-station message generating/analyzing unit, and MIMO transmission parameter deriving unit 503, and outputs the transport block data and average SIR which are obtained thereby to the transport block reliability information comparison and selection output unit 315.

In addition, when performing resending for HSDPA, the error correction decoding unit, average SIR calculating unit, ACK/NACK detecting unit, and MIMO transmission request detecting unit 502 detects ACK (=necessity of resending)/NACK (=unnecessity of resending) indicating whether the mobile node 107 requests the resending of a packet, which is contained in the decode data, and notifies this detection result to the packet/transport block dividing and converting unit, ARQ control/scheduling unit, transport block temporary memory unit, and MIMO transmission control/scheduling unit 500 including the ARQ control/scheduling unit.

Furthermore, the error correction decoding unit, average SIR calculating unit, ACK/NACK detecting unit, and MIMO transmission request detecting unit 502 detects a request for MIMO transmission from the mobile node 107, and notifies the MIMO transmission request to the packet/transport block dividing and converting unit, ARQ control/scheduling unit, transport block temporary memory unit, and MIMO transmission control/scheduling unit 500 including the MIMO transmission control/scheduling unit.

While the mobile node 107 is carrying out an uplink soft handover, the transport block reliability information comparison and selection output unit 315 selects transport blocks having a better quality from the local station's transport blocks outputted from the error correction decoding unit, average SIR calculating unit, ACK/NACK detecting unit, and MIMO transmission request detecting unit 502 and another station's transport blocks outputted from the packet/transport block dividing and converting unit, ARQ control/scheduling unit, transport block temporary memory, and MIMO transmission control/scheduling unit 500 according to a comparison between CRCs and average SIRs respectively showing the qualities of the local station's and other station's transport blocks, which are contained in those transport blocks, respectively, when receiving a mobile node identifier and a data number which are set thereto by the base station control unit and base-station-to-base-station communication message generating/analyzing unit 503, and outputs the selected transport blocks to the packet/transport block generating/converting unit, SIR information adding unit, and base-station-to-base-station message/packet converting unit 316 at the next stage.

In contrast, when no mobile node identifier and no data number are set thereto, the transport block reliability information comparison and selection output unit 315 determines that there is no necessity for comparison and selection, and outputs the local station's transport blocks outputted from the error correction decoding unit, average SIR calculating unit, ACK/NACK detecting unit, and MIMO transmission request detecting unit 402 to the packet/transport block generating/converting unit, SIR information adding unit, and base-station-to-base-station message/packet converting unit 316 at the next stage, just as they are.

The packet/transport block generating/converting unit, SIR information adding unit, and base-station-to-base-station message/packet converting unit 316 sets the transport blocks transmitted thereto and the CRC incidental to these transport blocks as a payload, generates a basic header and an extended header which are compliant with IPv6 based on a transmission destination address, a transmission source address, priority information, a flow label, an authentication header, etc. which are established by the base station control unit and base-station-to-base-station message generating/analyzing unit 319, packetizes these plural pieces of information into packets, and outputs the packets to the priority control unit 317 at the next stage.

When receiving these packets, the priority control unit 317 gives a higher priority to packets which request real time processing, such as voice packets, than to best effort packets based on the priority information and flow label which are contained in the basic header, and outputs the packets to the packet transmitting unit 318 at the next stage, and the packet transmitting unit 318 sends out them onto the IP network 105.

The base transceiver stations and the mobile communications system comprised of the base transceiver stations can support uplink and downlink soft handovers described in embodiment 1, and can also support an uplink soft handover, a handover with downlink SSDT, and HSDPA which are described in embodiment 2.

Hereafter, a description will be made as to an operation of performing MIMO transmission which provides multiple values of transmission symbol in space and implements higher-speed packet communications by simultaneously transmitting plural different transmission symbols by way of two or more transmission antennas using a plurality of base transceiver stations each shown in FIG. 9, which can be supported only by this embodiment 3.

When the mobile node 107 is staying in the cell under control of the base transceiver station 210, the mobile node 107 measures the reception power of each of cell search signals (e.g., CPICH: Common Pilot Channel which is defined by 3GPP) transmitted from other base transceiver stations providing cells adjacent to the cell in which the mobile node 107 is currently staying, transmits the IDs of two or more cells which are determined thereby that their cell search signals have reception power equal to or larger than a threshold predetermined in the system, and that radiocommunications can be carried out between the mobile node and each of the two or more cells, as well as the differences in reception power among the cell search signals of the two or more cells, to the base transceiver station 210 under current communication. The mobile node 107 also encodes a request for MIMO transmission and a transfer rate for high-speed packet communications which the mobile node requests, and transmits the coded MIMO transmission request and transfer rate to the base transceiver station 210.

The base transceiver station 210 detects the two or more cell IDs which are determined that each of the corresponding two or more cells provides a good radio line quality and radiocommunications can be carried out between the mobile node and each of the two or more cells by the mobile node 107, as well as the differences in reception power among the cell search signals of the two or more cells, by way of the transmit/receive antennas 309 and 310, duplexers 308 and 311, receiver 312, and demodulating unit, SIR calculating unit and primary cell/non-primary cell determining unit used for SSDT or the MIMO transmission 501. The base transceiver station 210 also detects the coded MIMO transmission request and requested transfer rate by way of the transmit/receive antennas 309 and 310, duplexers 308 and 311, receiver 312, demodulating unit, SIR calculating unit and primary cell/non-primary cell determining unit used for SSDT or the MIMO transmission 501, and error correction decoding unit, average SIR calculating unit, ACK/NACK detecting unit, and MIMO transmission request detecting unit 502.

In the base transceiver station 210, the detected cell IDs of the two or more cells each of which can be the primary cell, as well as the differences in reception power among the cell search signals of the two or more cells, are outputted from the demodulating unit, SIR calculating unit, and primary cell/non-primary cell determining unit used for SSDT or the MIMO transmission 501 to the base station control unit, base-station-to-base-station communication message generating/analyzing unit, and MIMO transmission parameter deriving unit 503. The detected two or more cell IDs, as well as the differences in reception power among the cell search signals of the two or more cells, are also outputted to the packet/transport block dividing and generating unit, ARQ control/scheduling unit, transport block temporary memory unit, and MIMO transmission control/scheduling unit 500.

The MIMO transmission request and requested transfer rate are outputted from the error correction decoding unit, average SIR calculating unit, ACK/NACK detecting unit, and MIMO transmission request detecting unit 502 to the base station control unit, base-station-to-base-station communication message generating/analyzing unit, and MIMO transmission parameter deriving unit 503. The MIMO transmission request and requested transfer rate are also outputted to the packet/transport block dividing and generating unit, ARQ control/scheduling unit, transport block temporary memory unit, and MIMO transmission control/scheduling unit 500.

In response to the MIMO transmission request, the base station control unit, base-station-to-base-station message generating/analyzing unit, and MIMO transmission parameter deriving unit 503 derives a transfer rate for which the local station makes a request of two or more other base transceiver stations which perform MIMO transmission from the two or more cell IDs which accompany the differences in reception power among the cell search signals of the two or more cells, according to, for example, the following equation:

the transfer rate for which the local station makes a request of other base transceiver stations=the requested transfer rate(bps)/the number of the cell IDs(count)    (1)

The base station control unit, base-station-to-base-station message generating/analyzing unit, and MIMO transmission parameter deriving unit 503 further determines coding rules (the number of transport blocks, transport block size, coding type, etc.) and modulation rules (a modulation method, a data format on the air, such as a pilot pattern, etc.) for each base transceiver station from the derived transfer rate, and generates a base-station-to-base-station message to notify these parameters required for MIMO transmission to the two or more base transceiver stations which perform MIMO transmission.

This generated base-station-to-base-station message is outputted from the base station control unit, base-station-to-base-station message generating/analyzing unit, and MIMO transmission parameter deriving unit 503 to the transport block/packet generating/converting unit, SIR information adding unit, and base-station-to-base-station message/packet converting unit 316, and this transport block/packet generating/converting unit, SIR information adding unit, and base-station-to-base-station message/packet converting unit 316 packetizes the message into packets and transmits them to each base transceiver station which performs MIMO transmission together with the local station via the priority control unit 317 and packet transmitting unit 318.

The base transceiver station 210 also transmits the parameters required for MIMO transmission and the cell IDs of the two or more other base transceiver stations which perform MIMO transmission to the mobile node 107.

The parameters required for MIMO transmission are outputted from the base station control unit, generating/analyzing unit, and MIMO transmission parameter deriving unit 503 to the MIMO transmission control/scheduling unit 500, and the MIMO transmission control/scheduling unit 500 converts the parameters required for MIMO transmission into transport blocks destined for the mobile node 107 and transmits them to the mobile node 107 by way of the error correction coding unit 305, modulating unit 306, transmitting unit 307, duplexers 308 and 311, and transmit/receive antennas 309 and 310.

The base transceiver station 210 adds the cell IDs of the two or more other base transceiver stations which perform MIMO transmission to the modulated data using the modulating unit 307 without performing any error correction coding on the cell IDs, and transmits the modulated data to the mobile node 107 by way of the transmitting unit 307, duplexers 308 and 311, and transmit/receive antennas 309 and 310.

Furthermore, in the base transceiver station 210, the base station control unit, base-station-to-base-station communication message generating/analyzing unit, and MIMO transmission parameter deriving unit 503 notifies the coding rules which are derived previously to the packet/transport block dividing and the generating unit, ARC control/scheduling unit, transport block temporary memory unit, and MIMO transmission control/scheduling unit 500. The packet/transport block dividing and generating unit, ARC control/scheduling unit, transport block temporary memory unit, and MIMO transmission control/scheduling unit 500 then divides and converts each input packet for MIMO transmission, which is destined for the mobile node, into transport blocks and controls transfer of them so as to transfer each input packet for MIMO transmission to both the error correction coding unit 305 of the local station and the other base transceiver stations.

The transport block reliability information comparison and selection output unit 315 makes the transport blocks which are to be transferred to the other base transceiver stations pass therethrough, and sends out them onto the IP network by way of the transport block/packet generating/converting unit, SIR information adding unit, and base-station-to-base-station message/packet converting unit 316, priority control unit 317, and packet transmitting unit 318.

Through the above-mentioned operation, the mobile communications system can simultaneously transmit plural different transmission symbols from the antennas of two or more base stations so as to provide multiple values of transmission symbol in space, and can implement higher-speed packet communications, as shown in FIG. 10.

In the example of FIG. 10, the base transceiver station 210 receives a request for MIMO transmission from the mobile node 107, the base transceiver station 210 transfers packets for MIMO transmission which are destined for the mobile node 107 to both the base transceiver station 212 and the base transceiver station 213, and the base transceiver station 210 enables both the base transceiver station 212 and the base transceiver station 213 to transmit radio signals, via downlink links, to the mobile node 107.

The base transceiver station which performs MIMO transmission changes as the mobile node 107 moves, as shown in FIGS. 10 and 11. At this time, when the mobile node 107 has reported the cell IDs of two or more cells which provide cell search signals having reception power equal to or larger than a predetermined threshold, as well as the differences in reception power among the cell search signals of the two or more cells, to the base transceiver station 210, the base transceiver station 210 determines a transfer rate for which it makes a request of the other base transceiver stations so as to derive MIMO transmission parameters according to the following equation:

the transfer rate for which the base transceiver station 210 makes a request of the other base transceiver stations=the requested transfer rate (bps)/(the number of the cell IDs−1)(count)  (2)

The base transceiver station 210 also notifies the cell ID of a cell which is currently performing MIMO transmission, as well as identifying information indicating a spare cell ID, to the mobile node 107, so that the mobile communications system can smoothly perform switching from FIG. 10 to FIG. 11 according to radio channel status conditions which vary with time.

Thus, the mobile communications system in accordance with embodiment 3 can implement MIMO transmission with good cost performance even when simultaneously transmitting a plurality of different transmission symbols from a plurality of transmission antennas to provide multiple values of transmission symbol in space according to an MIMO transmission method, thereby implementing higher-speed packet communications, since the mobile communications system can divide each packet into plural parts and carry out transmission processing using two or more base transceiver stations each having the routing function and base-station-to-base-station communications function according to both the radio line quality circumstances where the mobile node is placed, and a transfer rate requested by the mobile node.

INDUSTRIAL APPLICABILITY

As mentioned above, the base transceiver station apparatus and mobile communications system in accordance with the present invention are suitable for prevention of network congestions and any loss of packets due to a movement of the mobile node, as well as for reduction of the costs of the base transceiver station apparatus and mobile communications system which carry out high-speed packet communications.

The invention claimed is:

1. A handover controlling method for controlling a handover when a mobile node is moved between radio areas covered by two base stations, comprising steps of:
   requesting a destination base station to connect;
   requesting a source base station, through an interface between the source base station and the destination base station, to transfer a copy of a packet destined for the mobile node to the destination base station receiving the request of connection;
   transferring the copy of the packet from the source base station receiving the request of transfer to the destination base station through the interface; and
   transmitting the packet from the source base station and a copy of the packet from the destination base station to the mobile node.

2. The handover controlling method according to claim 1, further comprising a step of requesting the destination base station to connect using results of comparison between a received power from a source base station and a received power from the destination base station.

3. The handover controlling method according to claim 1, wherein the interface between the source base station and the destination base station corresponds to a local network connection path between the source base station and the destination base station that does not go through a gateway device at a boundary of a network shared by the source base station and the destination base station.

4. The handover controlling method according to claim 1, wherein after the source base station receives the request to transfer a copy of a packet destined for the mobile node to the destination base station receiving the request of connection, the source base station updates a routing table so that a packet destined for the mobile node is copied and the copy of the packet is transferred to the destination base station via the interface between the source base station and the destination base station.

5. A base station apparatus configured to perform a handover controlling method for controlling a handover when a mobile node is moved between radio areas covered by the base station apparatus, as a source base station, and a destination base station, comprising:
  circuitry configured to:
    request the destination base station to connect;
    receive, through an interface between the source base station and the destination base station, a request from the destination base station to transfer a copy of a packet destined for the mobile node to the destination base station;
    control transfer of the copy of the packet from the source base station receiving the request of transfer to the destination base station through the interface; and
    control transmission of the packet from the source base station and a copy of the packet from the destination base station to the mobile node.

6. The base station apparatus according to claim 5, the circuitry being further configured to request the destination base station to connect using results of comparison between a received power from a source base station and a received power from the destination base station.

7. The base station apparatus according to claim 5, wherein the interface corresponds to a local network connection path between the source base station and the destination base station that does not go through a gateway device at a boundary of a network shared by the source base station and the destination base station.

8. The base station apparatus according to claim 5, wherein after the circuitry receives the request to transfer a copy of a packet destined for the mobile node to the destination base station receiving the request of connection, the circuitry updates a routing table so that a packet destined for the mobile node is copied and the copy of the packet is transferred to the destination base station via the interface.

* * * * *